United States Patent [19]
Rogge et al.

[11] Patent Number: 5,500,890
[45] Date of Patent: Mar. 19, 1996

[54] POINT-OF-SALE SYSTEM USING MULTI-THREADED TRANSACTIONS AND INTERLEAVED FILE TRANSFER

[75] Inventors: Stanley A. Rogge, Houston; Christophe K. Cooper, Kingwood, both of Tex.

[73] Assignee: Exxon Research and Engineering Company, Florham Park, N.J.

[21] Appl. No.: 109,164

[22] Filed: Aug. 19, 1993

[51] Int. Cl.$^6$ .................................................. H04M 11/00
[52] U.S. Cl. ...................... 379/91; 340/825.33; 364/405; 235/380
[58] Field of Search ................... 379/91, 95, 41, 379/92, 93, 144; 370/95.1, 95.2, 85.8, 85.6; 340/825.3, 825.33, 825.35, 825.08, 825.5; 235/380, 382.5, 379, 381, 492, 382; 369/408, 405, 401, 406; 371/32, 33

[56] References Cited

U.S. PATENT DOCUMENTS

| | | | |
|---|---|---|---|
| 3,783,194 | 1/1974 | Vilips et al. | 375/8 |
| 4,349,695 | 9/1982 | Morgan et al. | 379/95 |
| 4,485,300 | 11/1984 | Peirce | 235/380 |
| 4,606,044 | 8/1986 | Kudo | 375/13 |
| 4,669,090 | 5/1987 | Betts et al. | 375/8 |
| 4,751,374 | 6/1988 | Nose | 235/380 |
| 4,796,292 | 1/1989 | Thomas | 379/91 |
| 4,812,628 | 3/1989 | Boston et al. | 235/380 |
| 4,894,847 | 1/1990 | Tjahjadi et al. | 375/8 |
| 4,939,767 | 7/1990 | Saito et al. | 379/100 |
| 5,008,883 | 4/1991 | Eitenhofer et al. | 370/95.1 |
| 5,025,469 | 6/1991 | Bingham | 379/98 |
| 5,031,207 | 7/1991 | Hesdahl et al. | 379/93 |
| 5,054,109 | 10/1991 | Blackburn | 455/54.2 |
| 5,144,651 | 9/1992 | Cooper | 379/98 |
| 5,255,182 | 10/1993 | Adams | 379/380 |
| 5,274,368 | 12/1993 | Breeden et al. | 340/825.31 |

FOREIGN PATENT DOCUMENTS

| | | |
|---|---|---|
| 0380160 | 8/1990 | European Pat. Off. . |

OTHER PUBLICATIONS

Tanzilla, K., "Six Second Verification," *Communication News*, Jun. 1990, p. 49.

*External Interface Specification*, "Visa 90 Link Level Protocol Referred To The Packet Assembler and Disassembler," Visa Int'l, Mar. 27, 1991, Ver. 2.2, pp. 1 Through a–45.

*General Information–Binary*, "Synchronous Communications" (3d ed.) IBM (Oct. 1970) pp. i–37.

*IBM 3600 Finance Communication System Custom Feature Description For BSC3 Communication, RPQ 8K0598 and 8K0599*, (3d ed.) IBM (Aug. 1977), pp. i Through X–4.

*Data Communicator*, Burroughs (24 Rev. 1) (Feb. 25, 1972) pp. 1–61.

*NCR Financial Systems Communication Interface Communication Discipline*, NCR Financial Systems (Nov. 1973), pp. 1–16.

*Dial Terminal Protocol*, Visa Dial Terminal System Pilot Project Notebood, pp. 1–18 (Aug. 1980).

*Point–of–Service Equip. Specs.*, "Second Generation Authorization" U.S. Ver. 1.0 (May 1987), Visa U.S.A., Inc.

*Point–of–Service Equip. Specs.*, "Second Generation Data Capture" U.S. Ver. 1.0 (May 1987), Visa U.S.A., Inc.

"Telecommunications protocols and design" by Spragins, pp. 284, 285, 1991.

*Primary Examiner*—Wellington Chin
*Assistant Examiner*—Ajit Patel
*Attorney, Agent, or Firm*—Pravel, Hewitt, Kimball & Krieger

[57] ABSTRACT

A dial-up asynchronous communication protocol allowing multiple POS terminals to efficiently multi-thread transactions to a host computer and to interleave mail messages and file transfers while retaining the ability to suspend these mail messages and file transfers when credit card authorization requests from the terminal or responses to those authorization requests from the host become available, and resume the mail messages and file transfers after the requests or responses have been transmitted.

25 Claims, 22 Drawing Sheets

POINT-OF-SALE SYSTEM USING MULTI-THREADED TRANSACTIONS AND INTERLEAVED FILE TRANSFER

BACKGROUND OF THE INVENTION

1. Field of the Invention

This invention relates to the transmission of data over a public switched telephone network (PSTN). More specifically, this invention relates to a point-of-sale dial data network with significantly enhanced credit authorization, mail messaging, and file transfer capabilities. This enhancement is achieved through the implementation of a unique dial-up asynchronous communications protocol that is the subject of this invention.

2. Description of the Related Art

Instantly verified electronic transactions are a growing trend in this service oriented world. Virtually gone are the days when a credit card transaction consisted of manually imprinting the card and then calling up a live human being to authorize the transaction. One now sees automatic card readers connected to computerized cash registers that communicate over a vast electronic network of interconnected authorization computers that quickly authorize one's credit card transaction, debit card transaction, check approval, or other type of financial or non-financial transaction. At least this massive electronic network hopefully approves one's transaction quickly. Unfortunately, as automatic credit card and debit card transacting have become more convenient, the networks have become more crowded, and transactions require increasing amounts of time for approval.

A recent innovation evolving from automatic credit card transactions has been unattended credit terminals at the point of sale or point of service. For example, petroleum service stations have increasingly begun to use a credit card reader and automatic transaction terminal for each individual gasoline pump. This allows customers to purchase gasoline on their credit or debit cards completely at the product dispenser without waiting in lines to sign their credit slip at the checkout counter.

Unfortunately, this also causes problems. A gas station with 15 pumps would ostensibly require 16 credit card transaction terminals, one for each pump and one for inside. This would usually require 16 telephone lines over which to communicate the transactions. As it is more desirable to use a single telephone line to handle all of these transactions, various parties developed systems for transmitting these transactions from multiple terminals over a single telephone line. Unfortunately, these systems suffer the drawback of not allowing a second transaction to begin until the first transaction has been completed, that is, until the first transaction has either been approved or disapproved. Thus performance is decreased and customers would have to wait.

To overcome the performance limitations, some network companies use a local negative file in the POS terminal while others simply run a "hot pump" while the authorization is pending approval. These methods have high administrative expenses or high bad debt rates. In the case of the local negative file, the terminal requires a large amount of memory for storing the file and the file must be updated frequently. In the case of the "hot pump," the merchant in some cases has already dispensed product when the credit denied message is returned, those resulting in lost product. It is desirable to perform a live authorization of each sale prior to dispensing product and yet not have irritating delays.

Two communications protocol related problems limit the utility of conventional dial data networks for the credit card industry. First, credit authorization is a serial process when dial up asynchronous communications protocols are used. The serial nature of these processes causes a backlog when multiple authorizations are pending. That is, each subsequent authorization cannot begin until the completion of the preceding authorization. Second, these protocols do not provide for mail messaging or file transfer.

Expanding on the first problem, conventional dial-up asynchronous communications protocols for a point-of-sale or point-of-service (POS) application establish a single-threaded, or serial, transaction process between the merchant's POS terminal and the host computer. Said another way, only one POS transaction may be communicated to the host at a time. While the host is processing the current request, the merchant's POS terminal cannot respond to additional requests. This is unacceptable in merchant locations with multiple POS terminals, such as service stations where the POS terminals are integrated into the motor fuel product dispensers.

Turning to the second problem, typical dial data networks are standalone entities optimized to perform single functions such as file transfer, mail messaging, claim adjudication or POS credit authorization. Due to varying performance, throughput, and cost requirements, it is rare to find dial data networks that combine these multiple functions in an efficient and cost effective manner. These problems are largely due to limitations in the communications protocols available for use in dial data networks. Synchronous communications protocols such as SNA and X.25 overcome these deficiencies, but they suffer from added complexity and large code size. Therefore, they are not commonly used in small, inexpensive terminals normally associated with dial-up POS applications.

The typical method of automating the credit card transaction approval process is to provide the retail store with a standalone authorization terminal equipped with a magnetic stripe card reader, a keyboard, a display, and an internal asynchronous modem that is connected to a local telephone line. When a credit card is moved through the magnetic stripe card reader, information is collected from the magnetic stripe of the card. The terminal application program then instructs the modem to go off-hook on the telephone line and dial a telephone number associated with a particular dial data network and host computer having approval authority for that card. After the call is answered, data communication is established, and information known as an authorization request is sent to the host computer. The request is processed, and an authorization code or other information is transmitted back to the terminal. Upon receiving the response, the terminal goes on-hook, and the call is terminated.

Communications protocols associated with POS authorizations are designed to efficiently move short messages (typically about one hundred characters in the request and fifty characters in the response) from single standalone POS terminals at the retail store to centrally located host computers. As the number of transaction approval requests increases at a particular merchant location, more POS authorization terminals, modems, and associated telephone lines are installed to maintain an acceptable level of service. The undesirable effect is the added expense of multiple modems and phone lines.

An alternative is to install multiple authorization terminals associated with a single communications controller and a single asynchronous modem that is connected to one telephone line. The desirable result is that the communications controller leverages multiple POS terminals over the expense of a single modem and telephone line. This, however, is offset by inherent delays in the conventional dial data communication process.

Examining the typical dial data communication protocol that controls the flow of messages from the POS terminal to the host computer reveals the single-threading type of protocol. The data communications protocols typically used are the Visa I, Visa II, Visa 90, T3POS, or similar protocols. These protocols are typically asynchronous, half-duplex, byte-oriented protocols with limited error detection and recovery characteristics. Under these protocols, after a connection is made, the network front-end processor (FEP) polls the POS terminal and the terminal responds with an authorization request. The POS terminal, or the communications controller and all associated POS terminals, must then wait until the host returns a response before initiating another authorization request. This is known as sequential, or single-threaded, communication.

This process poses few problems in merchant locations with a single POS terminal. Customer dissatisfaction does occur, however, in the multi-terminal example, particularly when one of the POS terminals is actually a pay point in a gas pump. With conventional single-threaded dial POS protocols, the customer will be subjected to unexpected and unexplained delays in credit approval when the store is busy with numerous credit authorizations, as the gas pump terminal cannot begin its authorization request until the store terminal and other, higher priority, gas pump terminals have received responses to their authorization requests. One response to this problem has been to set a pre-authorized amount level, or floor limit, below which authorization requests are not made to the host computer. However, this local in-store pre-authorization has the problem of increasing losses because a certain percentage of the credit transactions would not be approved by the host. Therefore a POS protocol is desirable which improves the response times in the multi-terminal cases, thus allowing all transactions to be verified with pre-authorized amounts not having to be set or changed to resolve peak load problems. It is also desirable for the POS protocol to allow the transmission of batch files and other enterprise store data over the transaction approval network without unduly impeding the transaction approval response time or appreciably increasing cost.

SUMMARY OF THE INVENTION

This invention offers a dial-up asynchronous communications protocol for a POS system that allows merchants with multiple POS terminals to efficiently multi-thread transactions, such as credit card authorization requests and responses, to a host computer and to interleave mail messaging and file transfers with the ability to suspend and then resume the mail messaging and file transfer processes when a credit card authorization request and response is given higher priority on the communications channel.

In a multi-terminal POS system designed according to the invention, a store controller is connected to a front-end processor (FEP) through a virtual communications network. The FEP is in turn connected to the authorization host computer or other various host computers. A standalone authorization terminal can be connected through this communications network without a store controller. Typically a number of pay points are attached to the store controller, and it controls those pay points and coordinates data going to and from those pay points. These terminals typically communicate over a local network with the store controller, which then converts those local network communications into a proper protocol to communicate with the FEP and the host computers.

In such a system designed according to the invention, an individual authorization request from one terminal connected to the store controller can be initiated before a response is received on an authorization request initiated from another of the terminals connected to the store controller. That is, each individual transaction need not queue up and wait for responses to previous transactions before that individual transaction is sent to the FEP. This is a multi-threaded protocol which significantly reduces transaction queuing and greatly speeds POS transactions.

Further in a POS system designed according to the invention, files can be uploaded or downloaded in a batch format, but with the feature that the file transfer is interrupted whenever a credit authorization request needs to go upline to a host, or a credit authorization response is available from a host to be transmitted to a terminal through the store controller. Thus, file transfers can occur in the background without appreciable interruption or delay to credit authorization requests and responses.

Finally, in a POS system according to the invention, multi-threaded authorization requests can occur in the foreground, with more than one request outstanding and thus more than one response pending from a host, while batch file transfers also occur in the background. These file transfers, either uploads or downloads, are interrupted whenever an authorization request must be transferred upline to a host, or an authorization response is available from a host. Further, multiple authorization requests can be transmitted before responses are received from the host.

BRIEF DESCRIPTION OF THE DRAWINGS

A better understanding of the present invention can be obtained when the following detailed description of the preferred embodiment is considered in conjunction with the following drawings, in which:

FIG. 1 shows an interleaved, multi-threaded asynchronous protocol operating between a multi-terminal retail store and a front-end processor.

DETAILED DESCRIPTION OF THE PREFERRED EMBODIMENT

Figure 1:
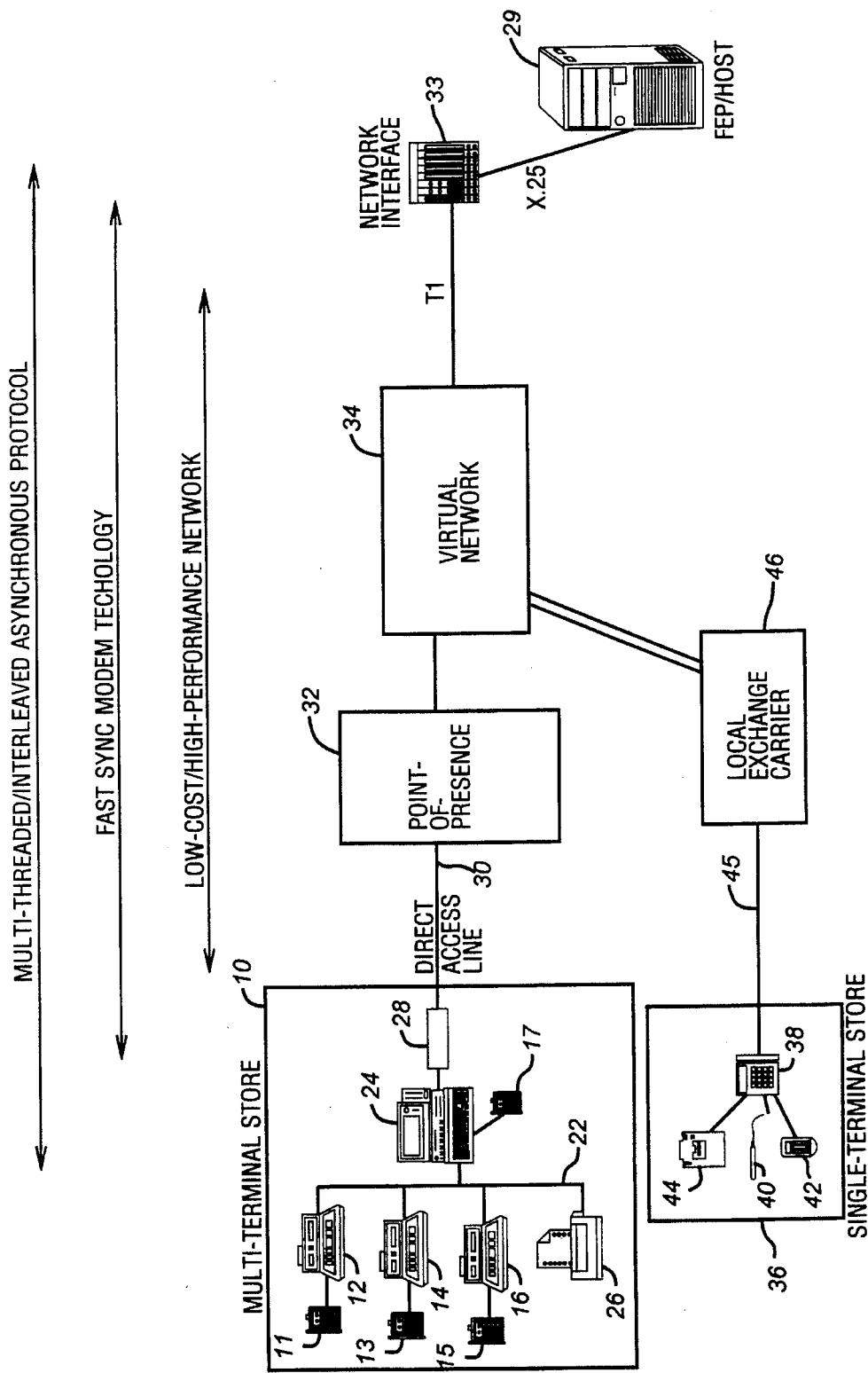
FIG. 1 shows a POS network consisting of a low cost, high performance dial-up network and fast synchronizing modem technology as defined by U.S. Pat. No. 5,144,651 and U.S. continuation-in-part application Ser. No. 07/870,497. In addition.

Turning now to the drawings, FIG. 1 shows a typical point-of-sale or point-of-service communications network that is used to practice the invention. The network consists of a low cost, high performance dial-up network using fast synchronizing modem technology as defined by U.S. Pat. No. 5,144,651 and U.S. continuation-in-part application Ser. No. 07/870,497, which are both incorporated herein by reference.

Specifically, a multi-terminal store 10 contains a number of individual POS authorization terminals, here shown as first, second, and third terminals 12, 14, and 16. Each POS authorization terminal 12, 14, and 16 can include, for example, a keyboard, a display, a magnetic strip card reader, a receipt printer, a personal identification number (PIN) keypad, and an electronic cash register or any combination of items shown collectively as accessories 11, 13, and 15. The terminals 12, 14, and 16 can be pay points in gas pumps, individual checkout terminals, or any other variety of POS terminals. The terminals 12, 14, and 16 connect to a controller 24, which is often a dedicated business personal computer adapted for communicating with the terminals 12, 14, and 16. Also connected to the controller 24 is a printer 26; further, the controller itself can include its own accessories 17, as do the POS authorization terminals 12, 14, and 16 include their own accessories 11, 13, and 15. The terminals 12, 14, and 16, the printer 26, and the controller 24 are all interconnected by standard networking technology 22, such as twisted pair or infrared link, and the network topology can be ring, star, ladder, or any other type. These networks are well known in the art, and the speed and topology of the network used are not critical.

The controller 24 in turn connects to a modem 28. The modem 28 can be a standard modem, but is preferably a fast synchronization modem as defined in U.S. Pat. No. 5,144,651 and U.S. continuation-in-part application Ser. No. 07/870,497. This fast synchronization modem technology allows the modem to establish a connection upline and negotiate communications speed more quickly than standard modem technology.

The controller 24, through the modem 28, eventually connects to a front-end processor (FEP)/host 29. The FEP/host 29 is typically a mainframe computer running a software application that facilitates on-line transaction processing and that receives and responds to messages from the controller 24. The "host" software of the FEP/host 29 typically responds to authorization requests for the proprietary card of the company which runs the FEP/host 29. For example, if the FEP/host 29 is a system run by Exxon Corporation, then it would typically include software to provide authorization responses for transactions using an Exxon credit or Exxon debit card. For other cards, such as MasterCard, Visa, or a bank debit card, the FEP/host 29 communicates with other host systems as will be described later, sending authorization requests and receiving responses from those hosts, and then sending the responses downline to the controller 24.

Although only one multi-terminal store 10 and one FEP/host 29 are shown, the multi-terminal store 10 can be capable of calling other FEP/hosts. Similarly, the FEP/host 29 is of course capable of multiple simultaneous connections to other stores.

The exact hardware used to connect the controller 24 to the FEP/host 29 is not crucial to practicing the invention and conventional techniques can be used. That hardware, however, preferably provides a quick connection between the controller 24 and the FEP/host 29 and performs lookups used to qualify the connection so that login sequences are not necessary. The preferred systems are those shown in referenced patent and application and are briefly described here to provide a simple background. In a ring down system as described in the referenced patent, a telephone line is taken off-hook and a signalling arrangement detects the off-hook condition and causes a predetermined telephone at a remote location to ring. No dialing is necessary. One exemplary provider of this service over a long distance is Sprint®, which provides the "VPN Hotline" service. The VPN Hotline service allows more flexibility than the conventional, short haul, ring down circuit.

Preferably, for best performance, a direct access line (DAL) 30 is provided from the modem 28 to a carrier point-of-presence (POP) 32, with all switching between the POP 32 and a network interface 33 being handled over a virtual network 34, which is typically provided by an inter-exchange carrier (IXC), such as Sprint. The insertion of the POP 32 and the network interface 33 allow the connection to be quickly made between the FEP/host 29 and the controller 24. The system performs basically as follows. The process commences when the modem 28 goes off-hook to initiate a call. The signalling equipment in the POP 32 detects this off-hook condition, with the computer system in the virtual network 34 knowing the effective address or identification of the caller. Because of the connection through the DAL 30, the caller is considered "on net," that is, positively identified by the virtual network 34. An address or identification lookup from a computer database in the virtual network 34 is then performed to determine where the call is to be placed. The final destination address or identification is provided by the lookup, with this information being passed through the SS7 compatible or similar network. The network passes the connection information to the network interface 33, which is typically a T1 to X.25 digital channel bank/modem PAD hybrid type interface, and the FEP/host 29 is informed of the connection.

This VPN Hotline service provides quick access because no actual dialing is done, and the local exchange carrier (LEC) switching arrangement is bypassed. Instead, a computer in the virtual network 34 senses via a conventional signalling arrangement (i.e., the POP 32) that the modem 28 has gone off-hook, performs a table lookup, and then initiates the connection process to the FEP/host 29. Thus the use of the available advanced technology has allowed the hotline or ring down circuit to be extended across long distances.

Also shown in FIG. 1 is a single terminal store 36. The single terminal store 36 is typically equipped with a standalone authorization terminal 38, which can include a keyboard, a display, a magnetic stripe card reader, and an internal asynchronous modem. Further, the standalone authorization terminal 38 can be connected to a bar code reading pen 40, a personal identification number keypad 42, and a receipt printer 44. Of course, other optional features can be connected to the standalone authorization terminal 38, as is well known in the art. In the single terminal store 36, the standalone authorization terminal 38 can be considered the logical equivalent to the controller 24 in the multi-terminal store 10.

The internal asynchronous modem in the standalone authorization terminal 38 can be a standard modem, but is preferably a fast synchronization modem as defined in U.S. Pat. No. 5,144,651 and U.S. continuation-in-part application Ser. No. 07/870,497. The modem in the standalone authorization terminal 38 can be connected to a POP 32 through a direct access line, as the DAL 30 above, or can be connected to a local exchange carrier (LEC) 46 via a standard telephone line 45. If connected to the LEC 46, preferably the terminal 38 cuts through the LEC 46 to directly access the virtual network 34, which again is typically an IXC, or inter-exchange carrier. The LEC 46 can be cut through using a service developed by Sprint® that is a more flexible alternative to the VPN Hotline service, which is referred to as "Switched Access VPN." In this service the standalone authorization terminal 38 dials a carrier equal access code and an end of dialing code to establish a cut through access to the virtual network 34 of that particular carrier, for example 10333# in the case of Sprint®. This dial sequence causes the standalone authorization terminal 38 telephone number to be forwarded to the virtual network 34 by a signalling sequence which includes as a significant element an automatic number identification (ANI) sequence. The virtual network 34 performs an identification lookup based on the telephone number to determine which features are available for this standalone authorization terminal 38. This lookup determines whether the Switched Access VPN feature is available, and if so, which type. If the Switched Access VPN feature is available, the standalone authorization terminal 38 is now cleared and is considered "on net" on the virtual network 34. Until the ANI lookup clears the standalone authorization terminal 38, the standalone authorization terminal 38 is considered "off net," that is, unidentified and not secure.

Two types of Switched Access VPN are available. In the first, referred to as immediate, only a single destination is available. In that case the virtual network 34 has retrieved the destination address as part of the lookup and simply provides the destination address to establish the connection to the network interface 33. In the second type of Switched Access VPN, referred to as delayed, numerous destinations can be accessed. If the virtual network 34 determines that the second type is set up for this particular calling location, then the virtual network 34 provides a dial tone to the standalone authorization terminal 38, which then provides a destination number (the full digit destination on-net number), and end of dialing code to the virtual network 34. The on-net number is the number used internally by the virtual network 34. When the virtual network 34 receives the on-net number, preferably a seven digit number, it retrieves a table for that destination number and does a validation lookup to determine if the particular standalone authorization terminal 38 is authorized by checking for the ANI information. If not listed, the standalone authorization terminal 38 is not authorized and a failure code in the form of a recorded announcement is returned. If listed, and thus authorized, the call proceeds.

As seen, features of this network include low cost, high performance, and fast synchronization modem technology, all of which are more thoroughly described and defined in U.S. Pat. No. 5,144,651 and U.S. continuation-in-part application Ser. No. 07/870,497. The network further includes an interleaved, asynchronous protocol as defined and described below. That protocol supports both multi-threaded transactions and interleaved file transfers. The multi-threaded, interleaved, asynchronous protocol can of course be used with different types of communications technology and on different types of networks, but it will be apparent to one skilled in the art that the principles of the invention remain the same.

Multi-Threaded Transactions

Figure 2:
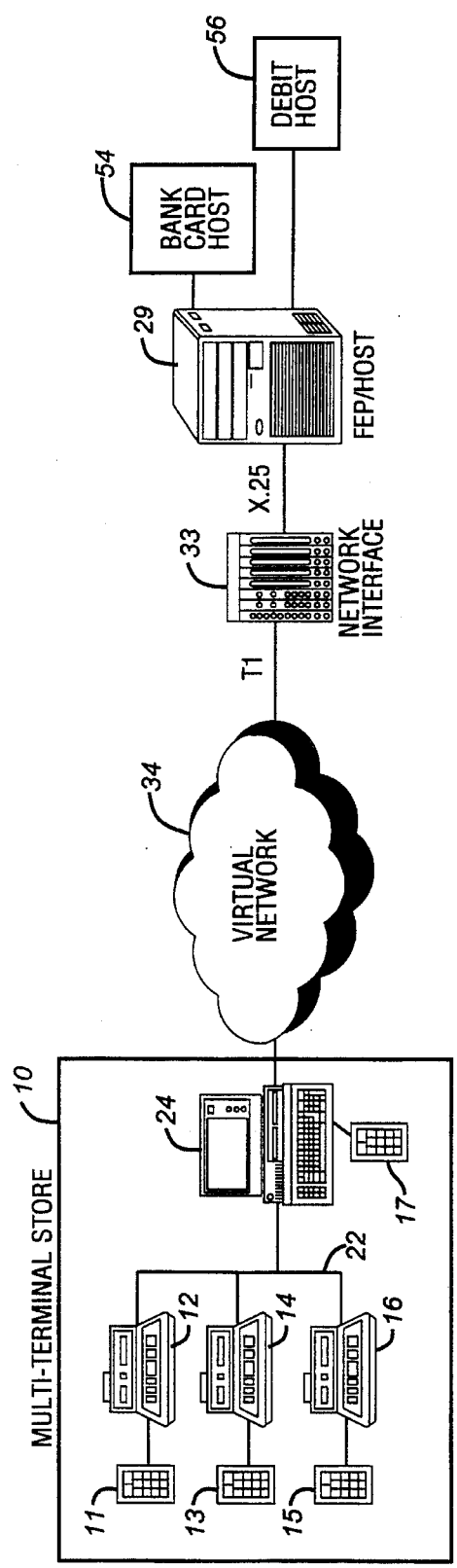
FIG. 2 shows the transaction flow between a multi-terminal store and a front-end processor/host where the system implements multi-threaded transactions according to the invention.
Figure 2:
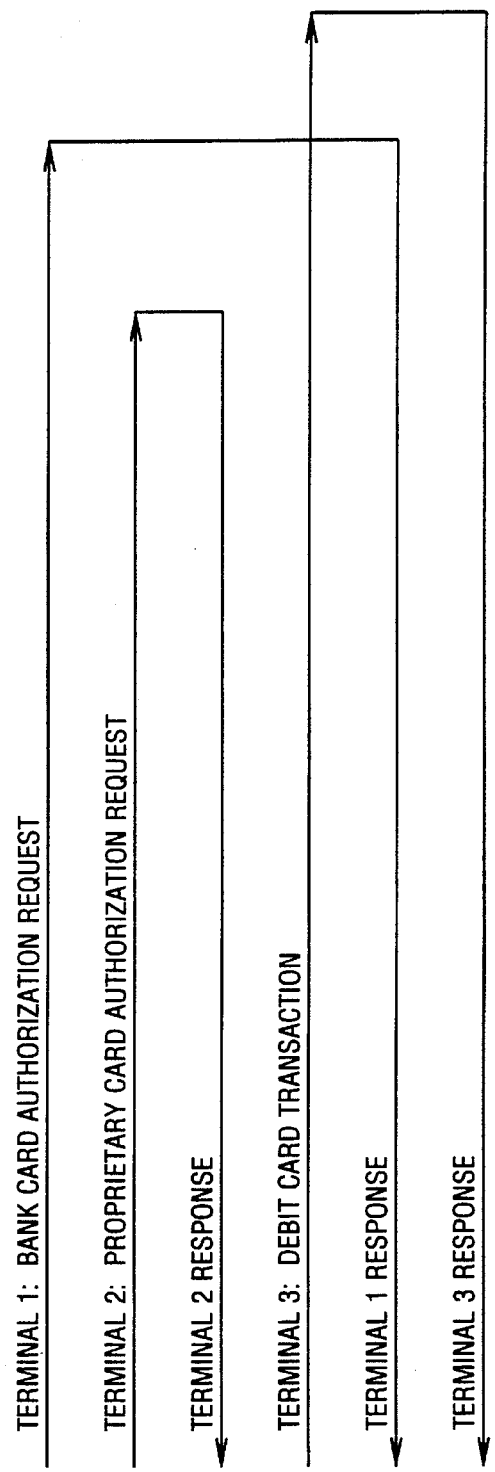

FIG. 2 shows how the multi-terminal store 10, through the controller 24, performs multi-threaded transactions with the FEP/host 29. The multi-terminal store 10 is merely illustrative, as the same multi-threaded protocol can also be implemented on a single terminal, on a controller, or on any other configuration of terminal device in which multi-threaded transactions are desired. As shown, the FEP/host 29, in addition to connecting to the channel bank 50, also connects, typically by X.25 networks, to a bank card host 54 and a debit host 56. The FEP/host 29 to which the multi-terminal store 10 connects is arbitrary, but is typically the FEP/host 29 owned by the franchisor. For example, an Exxon store is typically connected to an Exxon host, and an independent store using a Visa terminal is typically connected to a Visa host. But, because cards other than an Exxon card can be used in an Exxon store, the Exxon FEP/host must subsequently connect to other hosts to enable it to approve transactions using other cards, and thus the need for the connections to the bank card host 54 and the debit host 56.

The diagram in FIG. 2 shows the sequencing of multi-threaded transactions. In the diagram, a transaction is first entered on the first terminal 12. In this case, this transaction is a bank card authorization request, and the bank card host 54 is the host that must approve the transaction. The bank card authorization request is then passed from the first terminal 12 to the controller 24. If there are currently no ongoing transactions, the controller 24 must establish a communications link to the FEP/host 29 through the virtual network 34 and the network interface 33, again preferably with the fast connect technology previously discussed. The form of the communications link is not critical, as it is how the transactions are processed that achieves the multi-threaded aspect of the invention.

The bank card authorization request goes to the FEP/host 29, which passes that request on to the bank card host 54. A delay follows as the bank card host 54 determines if the authorization should be granted.

At this point, in the prior art, a transaction could not be initiated by the second terminal 14 until the conclusion of the transaction initiated by the first terminal 12. That is, an authorization request by the second terminal 14 could not begin until the bank card host 54 granted or denied the authorization request by the first terminal 12 and sent that response to the FEP/host 29, which then would send the response to the first terminal 12 through the controller 24. But with the protocol according to the invention, the second terminal 14 can immediately request an authorization for a second transaction while the response to the bank card authorization request from the first terminal 12 is still pending from the bank card host 54.

As shown in FIG. 2, the second terminal 14 thus transmits a proprietary card authorization request while the response to the first terminal 12 is still pending. This authorization request is typically handled by the FEP/host 29, which is typically the proprietary system managing all of the stores associated with the multi-terminal store 10. Although the FEP/host 29 handles the routing of the authorization request to the appropriate hosts in its network software, the computer system which runs the network software is usually the same computer system that runs the authorization software typically handled by a host. Thus, the FEP/host 29 includes both the network software and the host software used to authorize proprietary card authorization requests.

The proprietary card authorization request is transmitted upline by the controller 24 via the virtual network 34 and the network interface 33 and on to the FEP/host 29. Assuming the FEP/host 29 responds to the proprietary card authorization request more quickly than the bank card host 54, the FEP/host 29 then sends a response to the proprietary card authorization request to the controller 24 before sending a response to the bank card authorization request from the first terminal 12.

After the FEP/host 29 sends a response to the proprietary card authorization request from the second terminal 14, a debit card transaction is entered on the third terminal 16. This transaction is transmitted upline by the controller 24 to the FEP/host 29, which then determines with which host it must confirm this transaction, which in this case is the debit host 56. While the debit host 56 processes the debit card transaction, the bank card host 54 approves the bank card authorization request entered at the first terminal 12. The bank card host 54 sends a response to the FEP/host 29, which in turn responds to the controller 24, and on to the first terminal 12. Finally, the debit host 56 confirms the debit transaction and sends confirmation down through the FEP/host 29, the controller 24, and on to the third terminal 16. All pending requests are completed and the controller 24 can terminate the connection.

Thus, authorization requests and approvals need not occur sequentially. Each terminal can request authorization and then go "off line" until the approval is returned. This prevents delays when a number of transactions are carried on at one time.

Further, this multi-threading protocol improves performance with stored transactions. Stored transactions are used in POS networks for a variety of purposes, including storing authorization requests and credit card transactions that do not need immediate approval. For example, it is often inefficient to approve small transactions below some pre-authorized level, such as five dollars, immediately. Instead, a terminal stores that transaction for later transmission to the FEP/host 29. Similarly, before pumping gas, a credit card will typically be pre-authorized. Such a transaction can be stored or can be executed immediately, depending on the network, type of card, etc.

Further, if a terminal has a number of pending transactions, these can be prioritized by their importance. For example, a cancellation transaction typically takes precedence over a credit authorization transaction. The terminal, 12, 14, or 16 or the controller 24, depending on the configuration, can prioritize which transaction it will first seek approval for or transmit within its transaction queue. This can all be used to minimize customer delays in seeking approval for credit card transactions, while also minimizing the costs associated with calls through the virtual network 34.

Interleaved Authorization and Batch File Transfer

Figure 3:
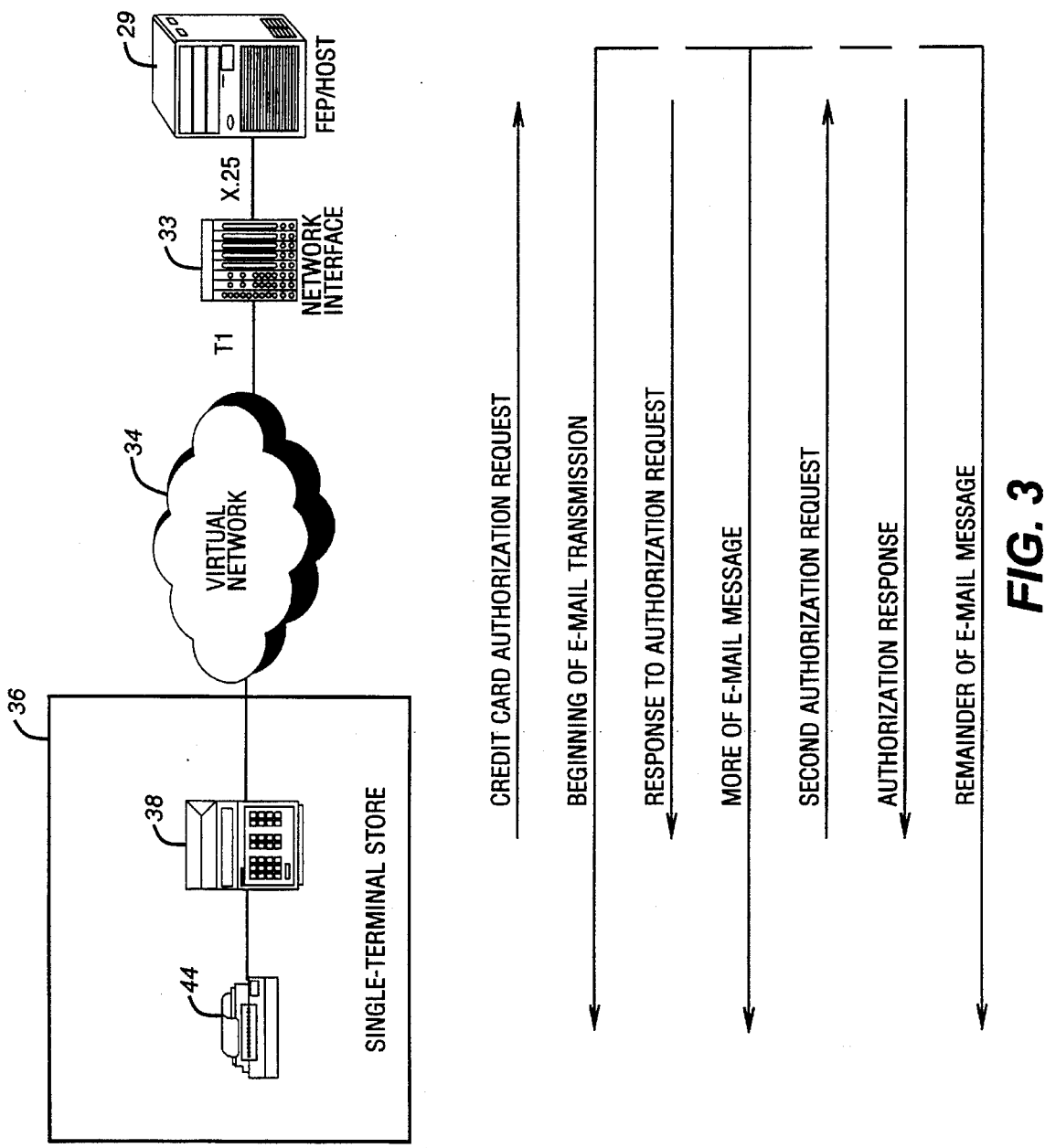
FIG. 3 shows the transaction flow between a single terminal store and a front-end processor/host in a system implementing interleaved file or E-mail transfers according to the invention.

FIG. 3 shows how interleaved transaction authorization and file transfer occurs in the single terminal store 36. Throughout this description, file transfer functions implicitly include any subset functions, such as mail messaging, as such functions use the same or similar format of a generic file transfer. A use for this feature would be, for example, to print out a file on the printer 44 while at the same time allowing credit authorizations through the standalone authorization terminal 38. Of course, interleaved filed transfer and transaction authorization would also be suitable for the multi-terminal store 10. As the diagram shows, a credit authorization request is entered from the standalone authorization terminal 38, goes through the virtual network 34, through the network interface 33, and finally to the FEP/host 29. As previously described, the authorization request may be sent on to the bank card host 54 or the debit host 56 as shown in FIG. 2, but this routing takes place at the FEP/host 29. While this authorization request is being processed, the FEP/host 29 initiates an electronic mail (E-mail) transmission, which is the equivalent of a file transfer. The FEP/host 29 begins the E-mail transmission through the network interface 33, the virtual network 34, the standalone authorization terminal 38, and to the receipt printer 44.

The E-mail transmission, and thus printing, continues until the response to the authorization request is ready, whereupon the FEP/host 29 suspends transmission of the E-mail transmission and transmits the response to the authorization request to the standalone authorization terminal 38. Once that authorization response has been transmitted, the FEP/host 29 resumes transmission of the E-mail message to the printer 44. Then, for example, a second authorization request is entered from the terminal 38. This authorization request takes priority over the E-mail transmission, so while it is transmitted upline, the FEP/host 29 suspends its transmission of the E-mail message. Processing of the authorization takes place, and in this case the authorization response is sent before the remainder of the E-mail message, because the authorization response occurred quickly enough. The FEP/host 29 sends the authorization response to the standalone authorization terminal 38, and then the remainder of the E-mail message is transmitted down to the printer 44.

An advantage of this interleaving is that files can be transmitted while still allowing authorization requests and authorization responses to take priority. Note that files could similarly be transmitted upline from the standalone authorization terminal 38, for example at the end of the day to transmit any batch of daily sales receipts to the FEP/host 29 for reconciliation. But, when a credit card authorization request was entered from the standalone authorization terminal 38, that file transmission could similarly be suspended while the authorization request is transmitted, and suspended similarly when the response is being sent to the standalone authorization terminal 38.

Multi-Threaded Transaction Authorization with Interleaved Batch File Transfer

Figure 4:
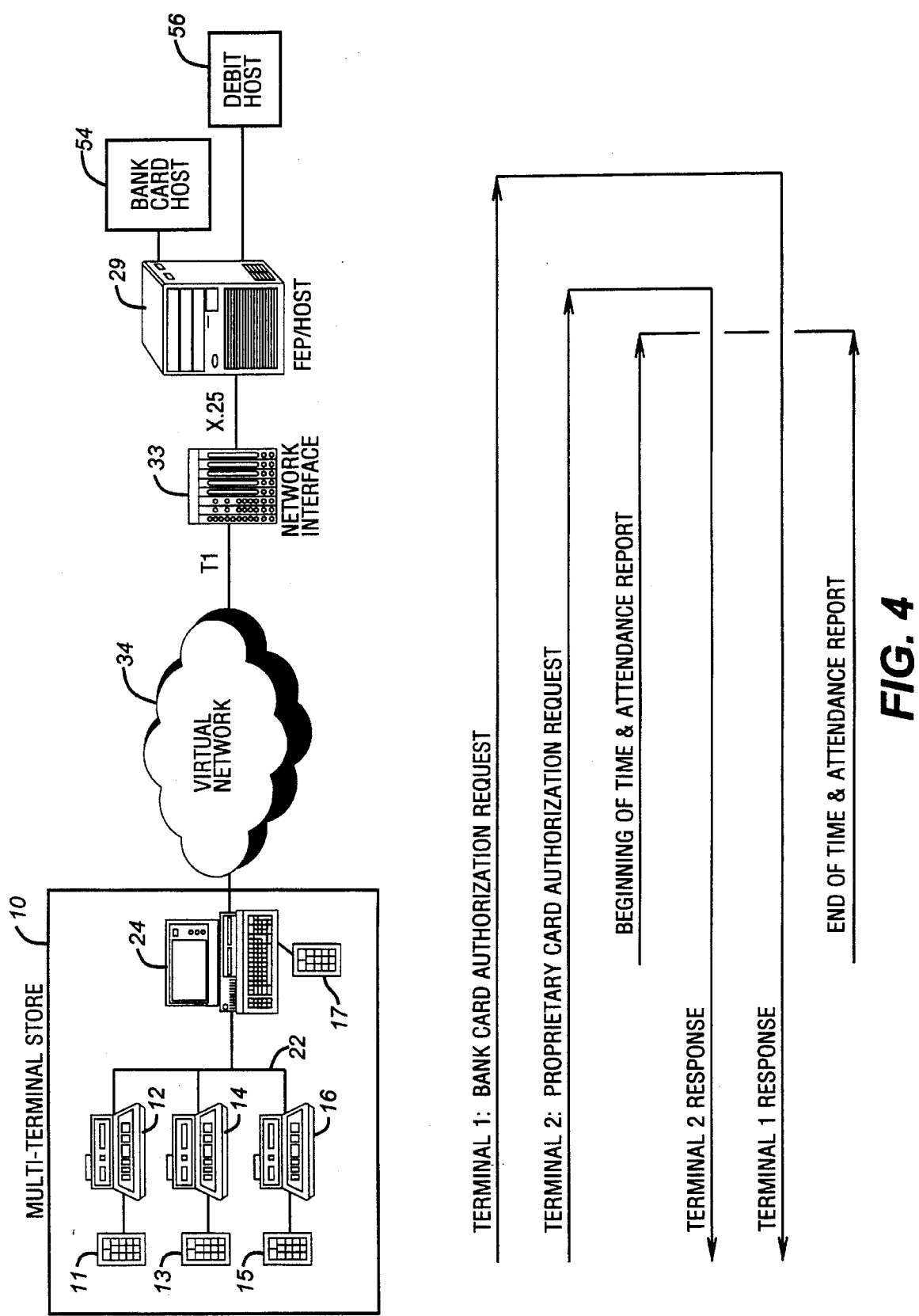
FIG. 4 shows the transaction flow between a multi-terminal store and a front-end processor/host in a system that implements both interleaved file transfer and multi-threaded transactions according to the invention.

FIG. 4 shows transaction flow in a system that combines the features of FIGS. 2 and 3. That is, FIG. 4 shows multi-threaded authorization requests and responses along with interleaved batch file transfer. FIG. 4 shows the multi-terminal store 10, with its first, second, and third terminals 12, 14, and 16. These connect to the controller 24, which connects to the virtual network 34 (using a modem which is not shown). This in turn connects to the network interface 33 via a T1 communications link, and in turn connects to the FEP/host 29, the bank card host 54, and the debit host 56. The data flow shown below the diagram illustrates how authorization requests and responses can be both multi-threaded and interleaved with file transfers. Again, the multi-terminal store 10 is illustrative only, and a single terminal or a cluster of terminals would also benefit from implementation of interleaved batch file transfer.

The first line of the transaction flow shows the first terminal 12 issuing a bank card authorization request upline through the controller 24 and on to the FEP/host 29. This is in turn transmitted on to the bank card host 54, where the authorization request is processed.

While this request is being processed, the second terminal 14 initiates a proprietary card authorization request to the FEP/host 29. As the FEP/host 29 handles this proprietary card transaction, it need not go further upline to the bank card host 54 or the debit host 56 (or any other connected host). While this proprietary card authorization is being processed, the controller 24 initiates a time and attendance report transfer to the FEP/host 29.

While this time and attendance report is being transferred to the FEP/host 29, the proprietary card authorization response for the second terminal 14 becomes available, so the FEP/host 29 directs the controller 24 to halt the transfer of the time and attendance report upline, and then the FEP/host 29 sends the proprietary card authorization response down through the controller 24 to the second terminal 14. At this point the bank card authorization request has still not resulted in a response. This relates to the multi-threaded aspect of the invention, as the second transaction began, and even ended, before the first transaction ended. After the second terminal 14 has received its response, the bank card host 54 completes the processing of the bank card authorization request from the first terminal 12 and sends the response downline through the controller 24 to the first terminal 12. Finally, after this response has been processed, the time and attendance report is further transferred upline from the controller 24 to the FEP/host 29.

In the multi-terminal store 10 situation, when one speaks of passing responses and requests through the controller 24, it must be realized that to the FEP/host 29, the controller 24 appears as a single terminal. The controller 24 handles the coordination of requests and responses from the multiple terminals, those here being the terminals 12, 14, and 16. The controller 24 places a header on each request that identifies to the controller 24 from which terminal 12, 14, or 16 the request has come. This header is a "tag along" header that is generally not used by the FEP/host 29. When the controller 24 receives a response from the FEP/host 29, it examines the returned header, which is the same as the "tag along" header that was transmitted with the request, and routes the response to the appropriate terminal transparently to the FEP/host 29. The controller 24 can alternatively keep track of which response is associated with which terminal 12, 14, or 16 in other ways, such as a lookup table based upon credit card number.

POS System Using Multi-Threaded Transactions

FIGS. 5A–B and 6A–E show flowcharts of the software used to control the controller 24 and the FEP/host 29 in a POS system designed according to the invention to implement multi-threaded transactions as shown in FIG. 2. Because the controller 24 and the FEP/host 29 are separate computer systems, each must have software capable of handling multi-threaded transactions for the protocol to be effective. The software is, however, capable of running in a single-threaded mode for older terminals not equipped for multi-threaded operation.

Figure 5A:
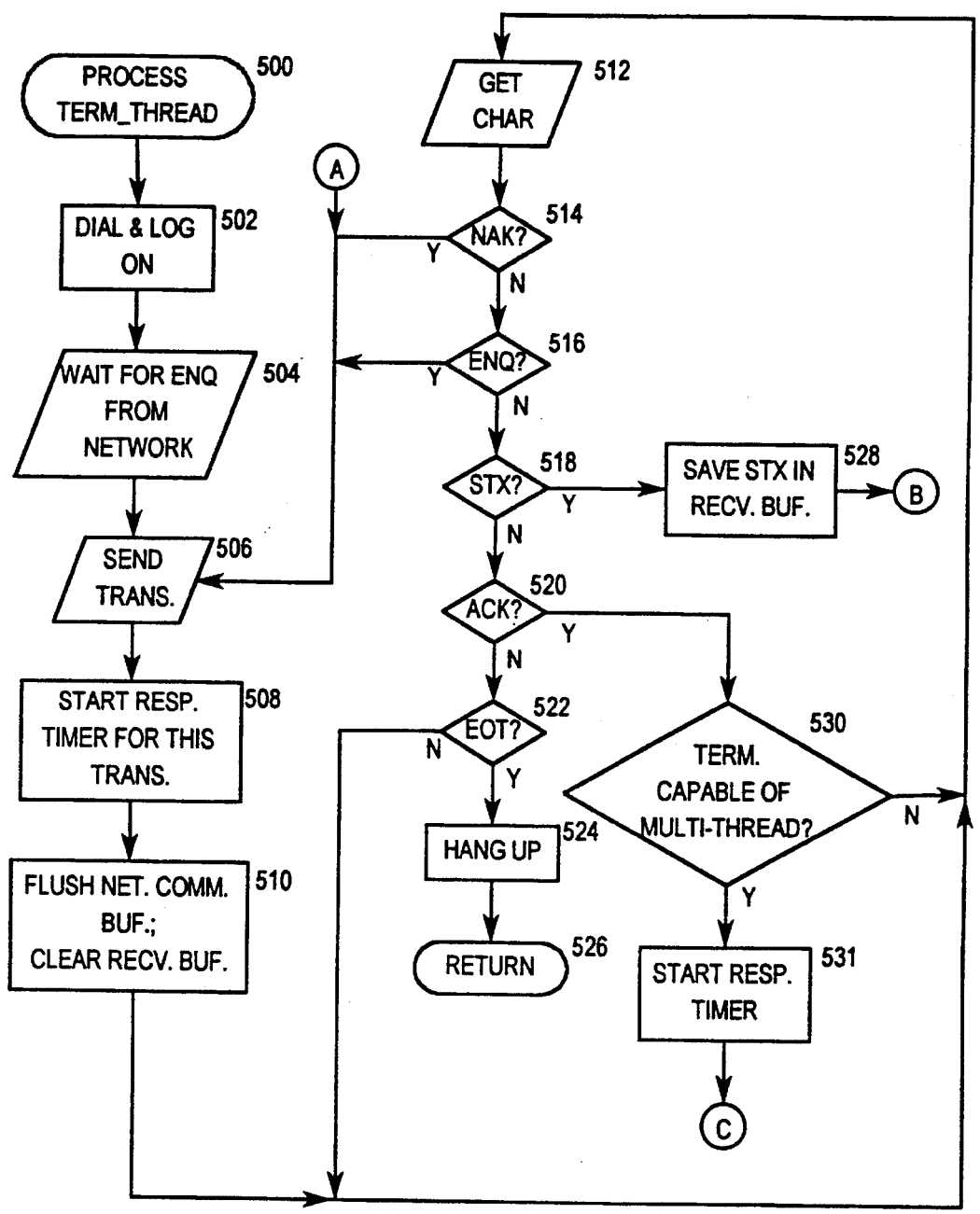
FIGS. 5A–B show a flowchart of software used in a store controller of a single or multi-terminal store to connect to a POS network and implement multi-threaded transactions according to the invention.
Figure 5B:
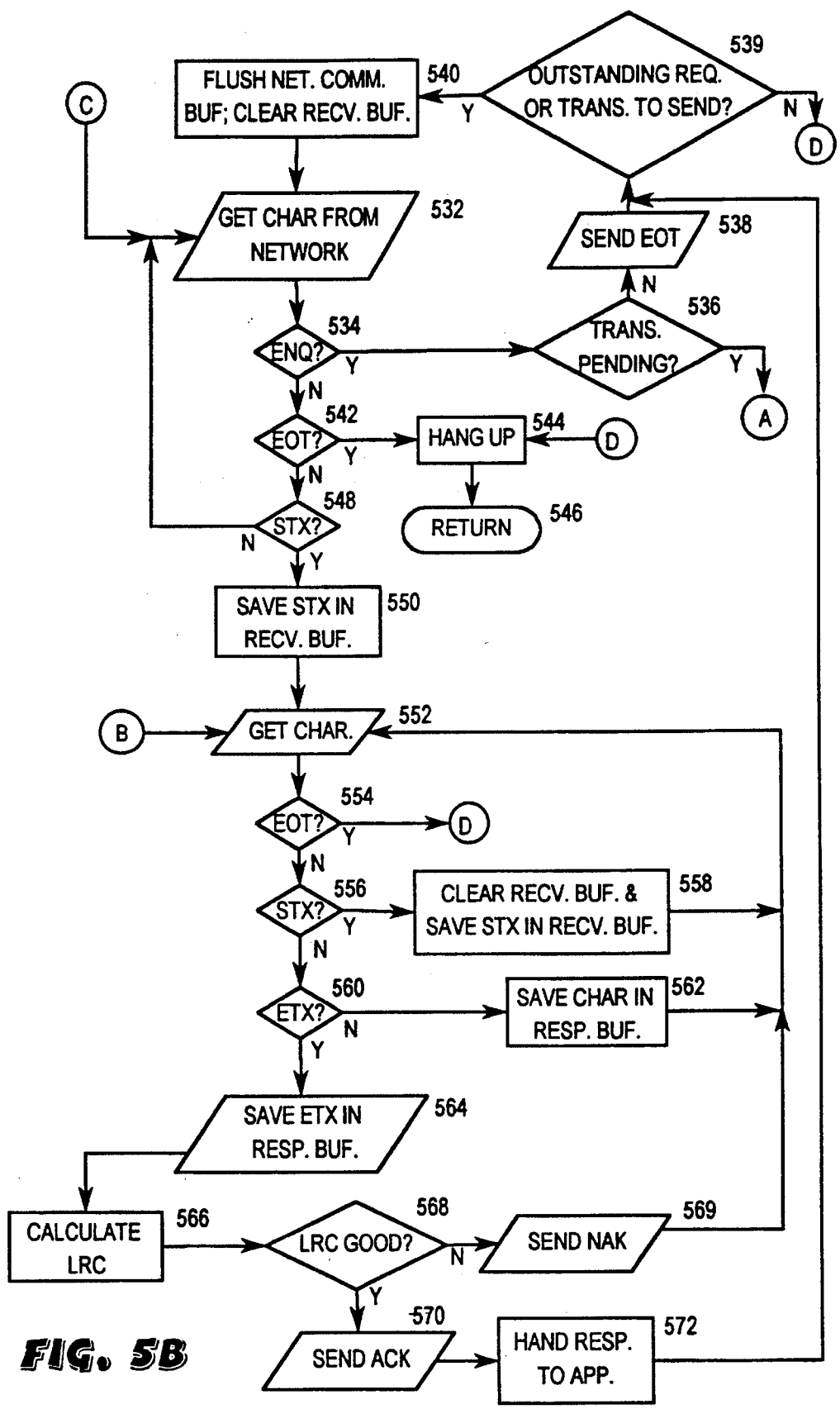

The flowchart in FIGS. 5A–B shows the flow of software used in the controller 24. This software is capable of controlling two types of terminals, multi-thread and single- thread. A multi-thread terminal is capable of handling multi-threaded transactions; a single-thread terminal is not.

Similarly, the FEP/host 29 executes software designed according to the flowchart in FIGS. 6A–D. Again, software designed according to this flowchart is capable of handling both multi-threaded terminals and single-threaded terminals.

Software according to the flowcharts in FIGS. 5A–D and 6A–D emphasizes the multi-threaded nature of the software, and to that end certain timeout loops that are standard in POS terminals, network interfaces, and front-end processors have been omitted. These timeout loops are well known in the art, and one skilled in the art of POS system design would readily understand how to put these various timeouts into the software.

As shown in FIG. 2, there are essentially three elements that need to communicate in the POS system according to this software. First, the controller 24 software is designated as the "controller end" of the network, or simply the TERMINAL. Second, the network interface software on the FEP/host 29 is designated as the "network end" of the network, or simply the NETWORK. Finally, the bank card host 54, the debit host 56, and any proprietary host software that is built into the same system that implements the FEP/host 29, are considered the "host end" of the network, or simply the HOST. To this end, the logical software used in each of these shall be designated as the TERMINAL, the NETWORK, and the HOST. In practice, the TERMINAL communicates with the NETWORK, which in turn communicates the authorization requests and responses with the HOST.

Certain characters have special meanings in communications between the TERMINAL, the NETWORK, and the HOST. These special characters are well known in POS systems, and generally perform standard functions. The STX, or start-of-text, character precedes a sequence of characters to be treated as message text. The ETX, or end-of-text, character terminates a sequence of text characters started with STX. The NAK, or negative acknowledgement, character is transmitted by a receiver when the receiver has not properly received the response from the sender. NAK thus requests a retransmission. The EOT, or end-of-transmission, character indicates the termination of a transaction. An EOT sent by the NETWORK indicates that the controller 24 should terminate the transaction and hang up. An EOT sent by the TERMINAL indicates the controller 24 has no more transactions pending. The ENQ, or inquiry, character indicates polling and is sent by the NETWORK to request a response from the TERMINAL. Finally, ACK, or acknowledge, indicates a proper receipt of a transmission from the sender. Other special characters may be substituted for the functions indicated without departing from the spirit of the invention.

TERMINAL Control Software

As previously described, FIGS. 5A–B show the flowchart for software used to control the TERMINAL, or controller 24, of the POS system used to practice multi-threaded transactions according to the invention.

Turning to FIG. 5A, process TERM$_{13}$ THREAD 500 begins at step 502 by dialing and logging on to the POS network. This is done by forming a communications link with the FEP/host 29, or the NETWORK. This can be a fast dial up, a direct access line 30, a switched access VPN 48, or any other of a variety of connections, including leased lines. The type of link is not critical, and logging on may not even be necessary, for example, as described in U.S. Pat. No. 5,144,651, and U.S. continuation-in-part Ser. No. 07/870, 497.

At step 504, the TERMINAL waits for an ENQ character from the NETWORK. This character is used to poll the TERMINAL for a transaction. When the TERMINAL receives the ENQ character, it sends a transaction to the NETWORK at step 506. These transactions are well known in the art, and generally comprise an authorization request for a particular HOST upline, begun and ended with STX and ETX, followed by an LRC (linear redundancy check) byte. Because the process $TERM_{13}$ THREAD 500 has just logged on, it will generally have a transaction pending. If, however, the process TERM THREAD 500 does not have a transaction pending, it sends an EOT character, which would signify that it has no pending transaction. In any case, the TERMINAL sends a transaction to the NETWORK at step 506 and proceeds to step 508, where it starts a response timer for this particular transaction. This response timer is used to ensure that the TERMINAL receives a response from the particular upline HOST from which it is seeking authorization within an arbitrary length of time. If the particular HOST is down, that HOST will not respond within this arbitrary time, and after a timeout the TERMINAL can take appropriate error steps not shown, such as hang up and display "Please Try Again" or "Host Unavailable."

The process TERM_THREAD 500 proceeds to step 510 where it flushes its network communications buffer and clears its receive buffer. The network communications buffer is used to hold incoming characters from the NETWORK in a first-in/first-out configuration, while the receive buffer is used to build responses from the NETWORK for later processing.

The process TERM_THREAD 500 then proceeds to step 512 where it gets a character from the NETWORK. This would be an appropriate place for a timeout loop, in case the NETWORK fails or the connection is severed, so that the TERMINAL can act appropriately, such as by hanging up and notifying the user that the NETWORK is not available.

Once the TERMINAL has received a character at step 512 from the network communications buffer, it proceeds to decode that character. If that character is an NAK at step 514, the process returns to step 506 and resends the same transaction, as an NAK from the NETWORK indicates that the NETWORK did not properly receive the transaction. At step 516, if the character was an ENQ, the process also proceeds to step 506 and resends the transaction, as an ENQ character is not a proper response to a normal transaction transmitted upline.

If the process receives an STX character from the NETWORK at step 518, this indicates that the NETWORK desires to transmit data downline. This message transmitted from the NETWORK to the TERMINAL is generally an authorization response, but could be another type of encoded message. For example, the NETWORK may desire to display something on the terminal 12, 14, or 16.

If at step 520 the character received by the TERMINAL is an ACK, this indicates acknowledgement of the sent transaction and that the transmitted transaction is being processed. If the character sent was an EOT at step 522, the procedure proceeds to step 524 where it hangs up the connection and returns at step 526. This is proper because an EOT transmitted by the NETWORK indicates that the TERMINAL is to terminate the connection. If the character was none of the above, that is, not an NAK, ENQ, STX, ACK, or EOT, the routine proceeds to step 512 to again get a character, as the received character was not valid.

Returning to step 518, if the received character was an STX, the routine saves the STX in its receive buffer at step 528. As the STX indicates the start of a message transmission from upline rather than a poll (i.e., an ENQ) from upline, this indicates a download message, and the process handles this STX transmission as will later be described in the discussion of FIG. 5B. If the response was an ACK at step 520, the routine proceeds to step 530, where it determines whether it is operating on a multi-threading or single-threading type terminal. If not a multi-threading type terminal, then the terminal cannot handle multi-threaded transactions, so the routine proceeds to step 512 to get another character. This is in anticipation of receiving an STX character indicating a response to the transaction transmitted at step 506. If the terminal is a multi-threading type terminal, however, the routine proceeds to step 532 where it restarts the response timer for this transaction. This is done because the terminal can handle multi-threaded transactions, and is free to send other transactions if they are pending on the terminal.

The processing for a multi-threaded terminal is shown in FIG. 5B. After the timer has been restarted at step 530, the routine proceeds to step 532, where it gets another character from the NETWORK through the network communications buffer. The routine tests to see if the character is an ENQ character at step 534. If so, the routine proceeds to step 536, where it determines whether the TERMINAL has another transaction pending; that is, whether another authorization request, for example, is waiting to be sent upline to the NETWORK for authorization by the HOST. If not, the TERMINAL at step 538 sends an EOT character to the NETWORK, which indicates it has no transactions pending.

The TERMINAL then proceeds to step 539, where it determines whether any transactions remain to send to the NETWORK or any requests have responses from the NETWORK still outstanding. If neither condition is true, then this TERMINAL session is complete, so the program proceeds to step 544 where it hang up, severing the communications link. Else, the program proceeds to step 540 where it flushes its network communications buffer and clears its receive buffer, and again proceeds to step 532 to wait for another character from the NETWORK.

If at step 536, however, another transaction is pending, the routine proceeds again to step 506, shown in FIG. 5A, to send the next available transaction upline to the NETWORK. As previously discussed, the controller 24 coordinates transaction requests from and responses to the terminals 12, 14, and 16. The controller 24, and thus the TERMINAL, appears to the NETWORK as a single POS terminal. As previously discussed, requests from each terminal 12, 14, or 16 are encoded with a "tag along" header, which is also returned as part of a response. Using this "tag along" header attached as a part of the response, the controller 24 can then route the response to the terminal that requested the response. As is apparent, it is possible for two or more transactions to be sent up to the NETWORK before an authorization response, begun with an STX, is transmitted down from the NETWORK to the TERMINAL. This is the feature of multi-threading.

If at step 534 the character was not an ENQ from the NETWORK, the routine proceeds to step 542, where it determines if the NETWORK has transmitted an EOT character. If so, the routine hangs up the line, or otherwise disconnects, at step 544 and returns at step 546. The process $TERM_{13}$ THREAD 500 will begin again the next time a terminal requires an authorization request.

If not an EOT character at step 542, the routine proceeds to step 548, where it determines whether the NETWORK has transmitted an STX character. The STX character would be the beginning of a transmission from the NETWORK. This would usually signify an authorization response to a previously transmitted transaction from the TERMINAL to the NETWORK. If the character is not an STX at step 548, the routine again proceeds to step 532 to get another character from the NETWORK through the network communications buffer.

If at step 548 the character received was an STX, the routine proceeds to step 550 where it saves the STX in its receive buffer. This is done in anticipation of building a response in the response buffer. Such a response is in the form <STX, data, ETX, LRC>. The routine then proceeds to step 552 to get another character from the NETWORK through the network communications buffer. Step 552 is also entered from step 528, shown in FIG. 5A, where the TERMINAL has initially received an STX from the NETWORK and has saved that STX in the receive buffer. After step 552, the routine proceeds to step 554, where it determines whether the next character received was an EOT. If so, the routine hangs up and returns at steps 544 and 546.

Otherwise, the routine checks for an STX character at step 556. If so, the routine, at step 558, clears the receive buffer and saves the STX in the receive buffer, and again proceeds to step 552 to get another character.

This is done because an STX character in the middle of a response message indicates to the TERMINAL to reset the receive buffer and again begin to receive the response message. This could be because of an error upline or a problem in the communications link. For example, noise on the telephone line can generate random characters causing such errors. Assume noise on the line randomly generates an STX character in the middle of a transmission between an STX and an ETX. This would be a protocol violation. The TERMINAL makes a best guess and discards the first STX and following characters, keeping the second STX and subsequent characters in attempt to build a good response. If the second STX was in fact a spurious character, this will typically result in an invalid LRC character and would result in a NAK being sent, instigating a retransmission of the message.

If the character received was not an STX at step 556, the routine proceeds to step 560, where it tests to determine if the character received is an ETX. If the character is an ETX, this indicates the end of a transmission begun by an STX, so the routine at step 564 saves the ETX in the receive buffer, and then at step 566 calculates the LRC, or linear redundancy code, of the transmission between the STX and ETX. The LRC is transmitted after the ETX, so at step 566 there is the implicit step of receiving the next character after the ETX.

After step 566, the routine proceeds to step 568, where it determines if the LRC transmitted by the NETWORK is correct. If the LRC is not correct, the routine at step 569 sends an NAK to indicate the transmission was not properly received, and proceeds to step 552 to get the next character in anticipation of receiving a retransmission of the previous message.

If at step 568 the LRC is good, the routine proceeds to step 570 and transmits an ACK to the NETWORK. This indicates to the NETWORK that the TERMINAL has properly received the transmission of the response message.

Then, at step 572, the TERMINAL software gives the response to the proper application. An application, in the context of the TERMINAL, could be a variety of programs used to communicate over the POS network. Typically, an application would simply be the software running a single POS terminal, such as the terminal 12, 14, or 16. Such an application simply requests approval for credit card transactions. An application could also handle, however, some other type of transaction, taking appropriate action such as activating a product dispenser, printing a receipt, or indicating an error condition, for example. For example, the application might be a supplies request application in the controller 24. When the store operator needed more gasoline, for example, such an application could request those supplies over the POS network. The application would prepare a transaction as described and send it over the NETWORK, waiting for a response. The controller 24, on which the TERMINAL runs, handles the routing of the messages from applications to the FEP/host 29. Using a routing header, or other information, it determines which of the terminals 12, 14, or 16 a particular response is intended for, or which other application, such as a printer driver or a supplies request program as mentioned.

After handing the response to the proper application at step 572, the routine proceeds to step 539, where it checks for outstanding requests or transactions to send, and then to step 540, where it flushes the network communications buffer and clears the receive buffer, and again proceeds to step 532 to get another character from the NETWORK through its network communications buffer.

If, at step 560, the character received was not an ETX, the routine proceeds to step 562. The character is then a character between an STX and ETX in a transmission from the NETWORK, so the character is saved in the response buffer at step 562, and the routine proceeds to step 552 to get the next character.

NETWORK Control Software

FIGS. 6A–E show a flowchart of the software used by the NETWORK, which runs on the FEP/host 29, to communicate transactions with the TERMINAL, which runs on the controller 24, and to route those transactions to and from the HOST. Again, this software is designed to allow multiple transactions to be transmitted from the TERMINAL before the respective authorizations have been returned from the HOST. This is multi-threading. That is, the TERMINAL can send multiple transactions while the HOST is performing the authorization function for previous transactions. This can result in marked performance improvement, as the authorization delay may be relatively long if a national or regional debit gateway is behind the authorization HOST.

Figure 6A:
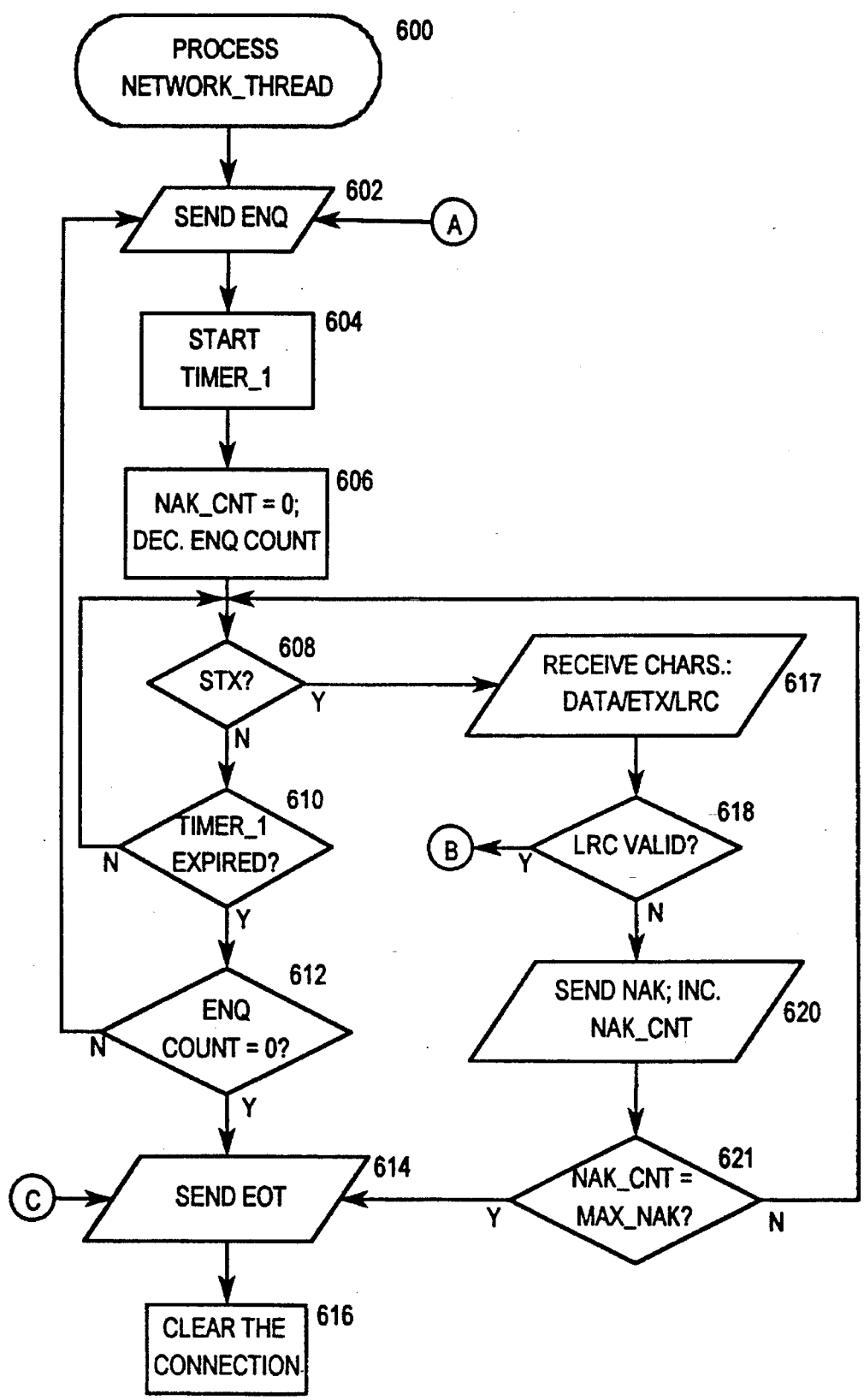
FIGS. 6A–E show a flowchart of software implemented in a front-end processor/host that implements the multi-threaded transaction protocol according to the invention.
Figure 6B:
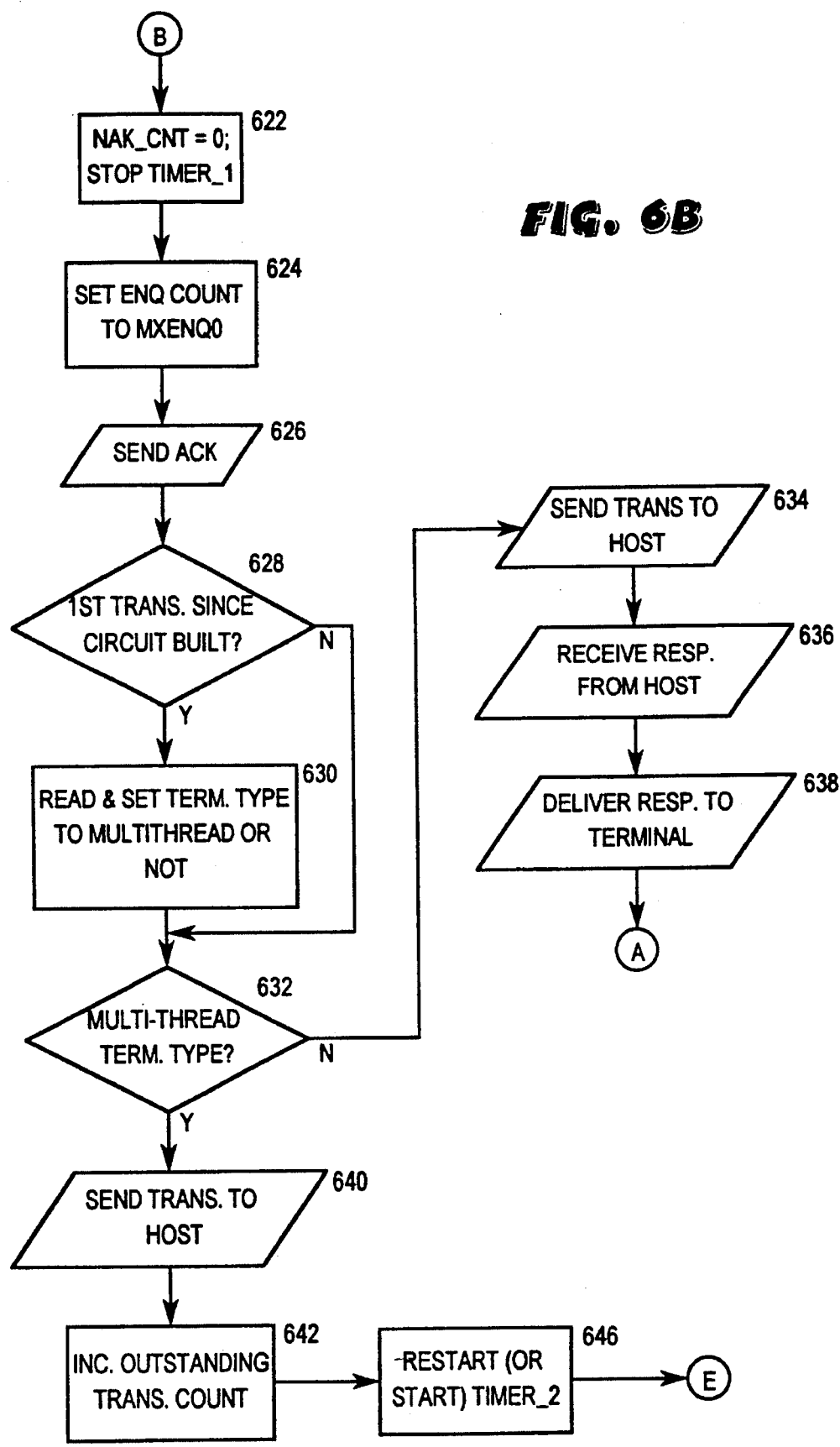

FIG. 6A shows a process NETWORK_THREAD 600. The process NETWORK_THREAD represents one task executed in the FEP/host 29. A separate task is executed for each connection made to the NETWORK. That is, a separate task communicates with each controller 24 on which the TERMINAL software runs; multiple controllers 24 are not handled by a single process NETWORK_THREAD 600.

Turning to the process NETWORK_THREAD 600 in FIG. 6A, the NETWORK first sends an ENQ to the TERMINAL to poll for a transaction at step 602, starts a TIMER$_{13}$ 1 at step 604, and decrements an ENQ counter and resets a NAK counter NAK_CNT to zero at step 606. The TIMER_1 is a timeout to ensure that the TERMINAL responds to the ENQ within a predetermined amount of time. The ENQ counter has been initially set to a predetermined value, such as four, to set the number of times an ENQ character can be sent to the TERMINAL without any response being received. NAK_CNT counts the number of NAK characters sent by the NETWORK. If this count exceeds a predetermined limit (MAX_NAK) before the NETWORK sends an ACK, the connection is terminated.

At step 608, the NETWORK determines if it has received an STX character from the TERMINAL. The STX character is the beginning of a transaction message, and is sent by the TERMINAL when it desires an authorization. As the TERMINAL necessarily has a pending transaction when it dials onto the NETWORK, the STX should be the first response to an ENQ sent by the NETWORK. However, characters are tested and discarded until an STX character is detected.

If an STX character is not received at step 608, the routine proceeds to step 610 to determine if the TIMER_1 has expired. If it has not, the routine loops to step 608. If it has, the routine proceeds to step 612 to determine if the ENQ counter has reached zero, indicating that the predetermined number of nonresponded polls of the TERMINAL have been completed. If so, the process NETWORK_THREAD 600 sends an EOT, or forced disconnect, character at step 614 to the TERMINAL, and clears the connection at step 616. If at step 612, the ENQ counter has not reached zero, the routine again proceeds to step 602 to send another ENQ and attempt to receive a transaction.

Returning to step 608, if the NETWORK has received an STX character, it proceeds to step 617 and reads and stores in a receive buffer all the characters up to the ETX and its following LRC. Then the routine proceeds to step 618 to determine whether the received transaction is valid; the transaction is valid if the LRC character after the ETX matches the LRC value calculated from the received data.

If a valid transaction has not been received from the TERMINAL, the NETWORK proceeds to step 620 where it sends an NAK to the TERMINAL and increments NAK_CNT. Proceeding to step 621, the routine compares NAK_CNT to MAX_NAK. If NAK_CNT has exceeded this threshold, then the routine proceeds to step 614 and sends an EOT and then to step 616 where it clears the connection. This occurs because the NETWORK has been unable to receive valid messages from the TERMINAL.

If, at step 621, MAX_NAK has not been reached, then the routine returns to the STX loop at step 608, waiting for a valid message. If a valid transaction has been received at step 618, the routine proceeds to step 622 shown in FIG. 6B. At step 622, the process NETWORK_THREAD 600 stops TIMER_1 and resets NAK_CNT to zero, at step 624 sets the ENQ counter to MX_ENQ0, which here is three, so that the ENQ counter is reset so that the predetermined number of nonresponses is still utilized before termination, and at step 626, sends an ACK character to the TERMINAL, acknowledging receipt of the transaction. Again, the transaction received is typically an authorization request for the HOST.

At step 628, the process then determines if this is the first transaction since the circuit or connection was established. If so, at step 630, the NETWORK determines if the terminal is a multi-threaded or single-threaded type terminal and sets an appropriate flag. This step is only necessary to provide compatibility with both single- and multi-threaded terminals on the network. Such a feature, of course, is highly desirable. If the terminal is single-threaded, the NETWORK simply waits for an authorization response from the HOST whenever it sends an authorization request to the HOST, as the NETWORK will not be receiving another authorization request from the terminal until the NETWORK responds to the last authorization request. The routine then proceeds from step 630 to step 632. If this is not the first transaction, control proceeds from step 628 to step 632.

At step 632, the routine determines if the transaction has been sent by a multi-threaded type terminal. If not, then this terminal is not capable of handling multi-threaded transactions, so the routine proceeds to step 634, where it sends the transaction on upline to the HOST, at step 636 waits for a response from the HOST, and at step 638 transmits the response to the TERMINAL. This response is transmitted as a normal message, beginning with an STX and ending with an ETX followed by a LRC character. The routine then sends another ENQ at step 602, requesting another transaction.

If at step 632 the terminal is a multi-threaded type terminal, however, then the terminal is capable of handling multi-threaded transactions, so the routine proceeds to step 640, where it sends the transaction to the HOST, and then, at step 642, increments the outstanding transaction counter. This is done to prevent exceeding a maximum number of outstanding transactions, and also to keep track of when there are no longer any outstanding transactions pending in the host. Then, at step 646, the process restarts or starts a TIMER_2 and proceeds to step 648 in FIG. 6C. TIMER_2 is a timeout to return an error if the HOST takes too long in responding to the authorization request.

At step 648, the routine starts a pause timer, TIMER_PAUSE. TIMER_PAUSE prevents the network from polling the POS terminal too frequently. TIMER_PAUSE is a timeout specifying how long to wait for a response from the HOST before sending another ENQ. Then, at step 650, the routine determines if a HOST response is available. If not, the routine proceeds to step 652 to test if TIMER_PAUSE has expired. If not, the routine loops back to determine if a HOST response is available at step 650.

If at step 650 a response is available from the HOST, the routine at step 654 stops TIMER_PAUSE, and then calls the process SEND_RESPONSES at step 656. This routine, described later in relation to FIG. 6E, transmits all available outstanding responses from the HOST to the TERMINAL. When all responses are sent, the process SEND_RESPONSES returns process control back to this point. Thus, the NETWORK gives priority to transmitting all responses available from the HOST to the TERMINAL. Only after the NETWORK has taken care of all such responses does it again poll the TERMINAL for another transaction request.

Next, the routine proceeds to step 658, where it determines if there are any outstanding transactions by comparing the outstanding transaction counter to zero. If there are outstanding transactions (that is, if not equal to zero), the routine proceeds again to step 602 in FIG. 6A and repeats the entire process by sending another ENQ character and waiting for responses.

Figure 6C:
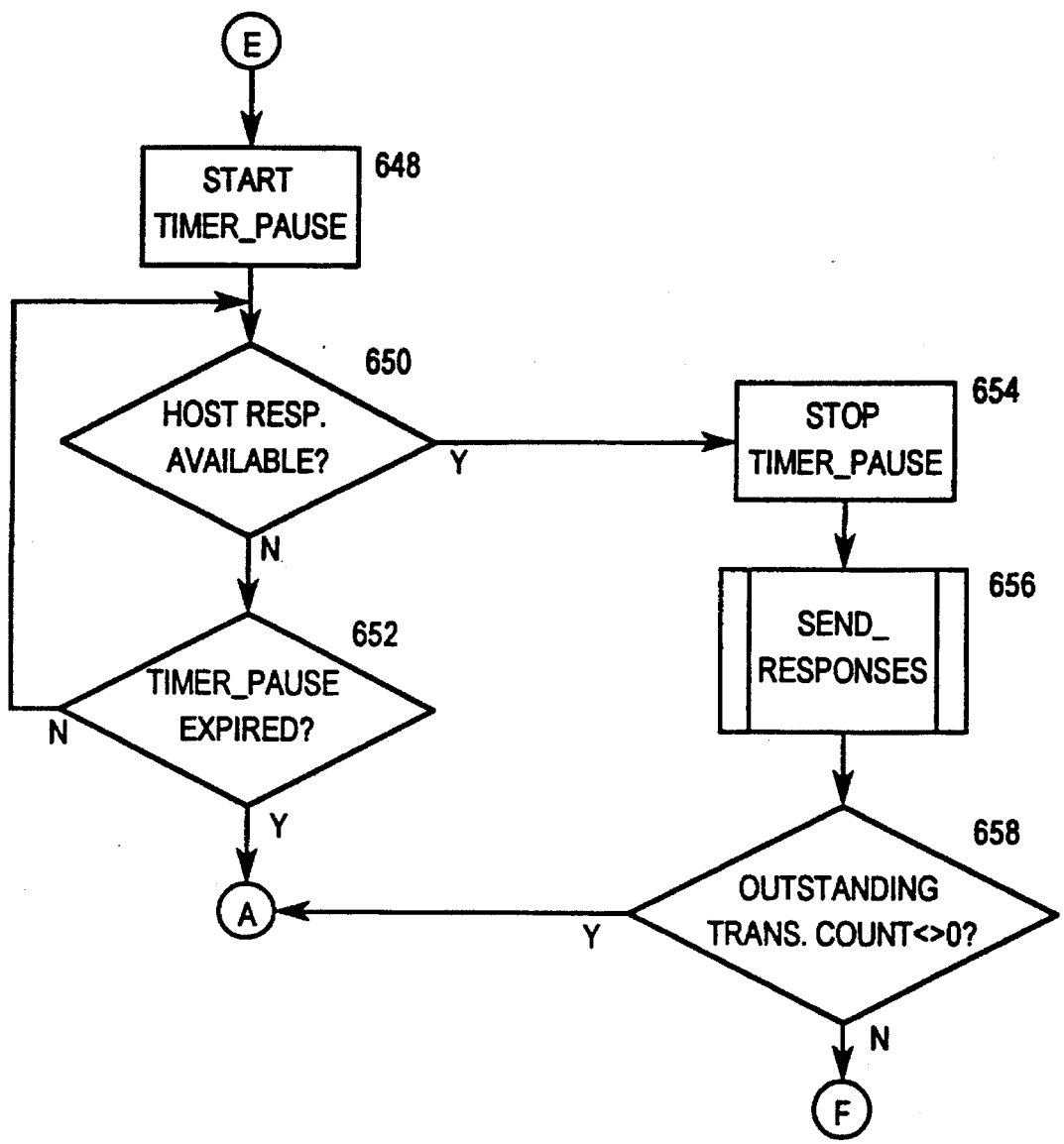
Figure 6D:
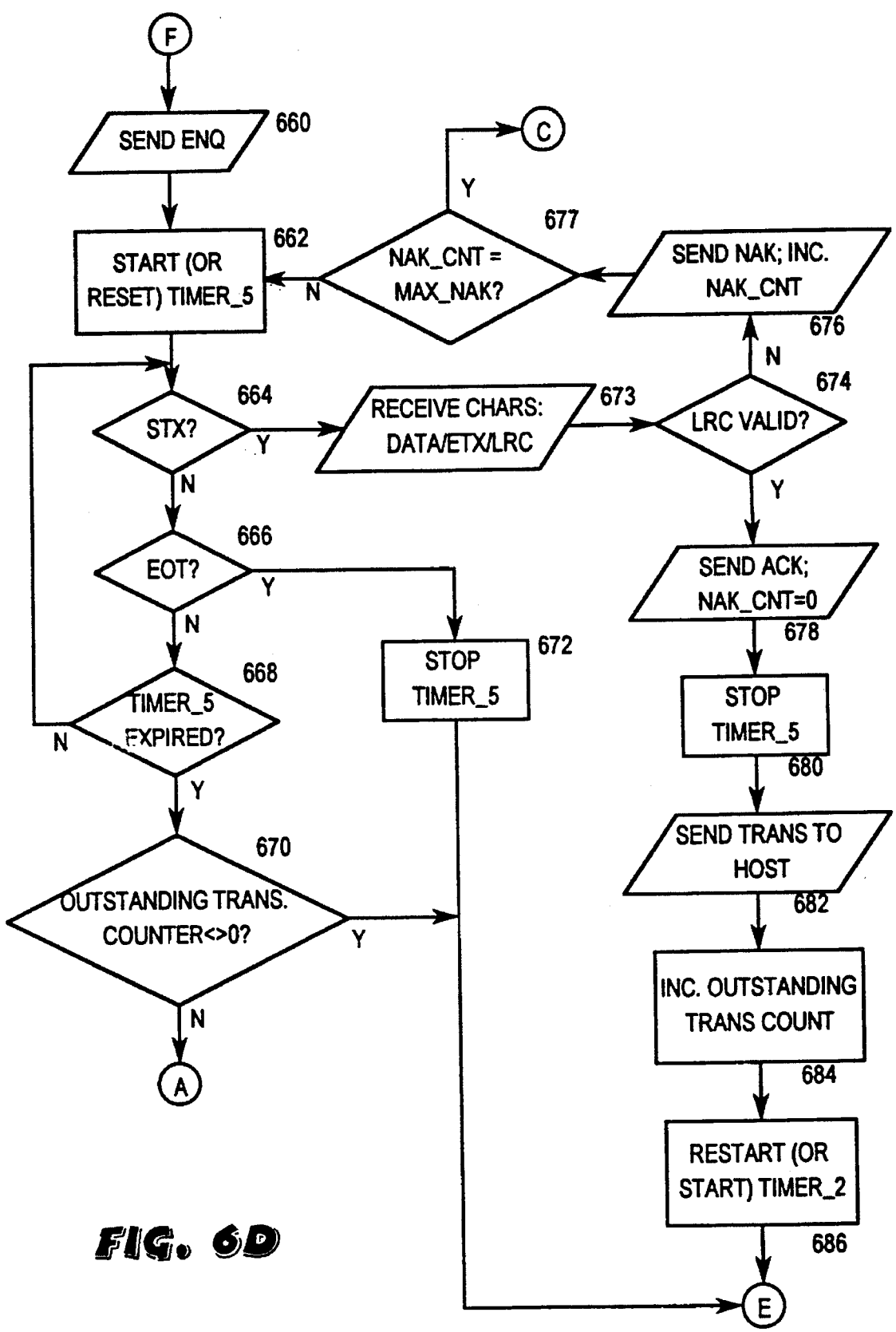

If at step 652 TIMER_PAUSE has expired, or at 658 the outstanding transaction count has reached zero, the routine proceeds to step 660, shown in FIG. 6D, which is a polling loop.

FIG. 6D represents a polling loop to be entered when there are no longer transactions outstanding in the HOST or when the HOST has not properly responded to a previous outstanding transaction. At step 660, the routine first sends an ENQ character to the TERMINAL, and then, at step 662, starts or resets a TIMER_5, which is a timeout for ensuring a response from the TERMINAL to an ENQ after it has been established that the TERMINAL is connected. Compare this to TIMER_1, which is a timeout for initially receiving a response from the TERMINAL upon connection. TIMER_5 is generally a shorter timer than TIMER_1, for when it is known that the TERMINAL is connected, it should take less time to determine that it has become disconnected. The routine then determines if a character is available from the TERMINAL, and whether it is an STX at step 664. Again, the STX character indicates the beginning of a transaction.

If at step 664 an STX has not been received from the TERMINAL, the routine tests at step 666 to determine if an EOT character has been received from the TERMINAL. If not, the routine proceeds to step 668 where it determines if TIMER_5 has expired. If not, the loop is repeated starting at step 664, again getting characters from the receive character queue and testing for an STX or an EOT. All steps to get a character are not detailed. If the timer has expired at step 668, the routine proceeds to step 670, where it determines whether the outstanding transaction counter is not zero, and thus outstanding transactions remain. If transactions remain, the routine returns to step 648 in FIG. 6C, where it enters a loop waiting for responses from the HOST.

If, at step 670, the outstanding transaction equals zero, no outstanding transactions to the HOST remain, so the routine proceeds to FIG. 6A and again sends an ENQ character to the TERMINAL asking for new transactions.

If at step 666 an EOT has been received from the TERMINAL, there are no more transactions from the TERMINAL, so the routine proceeds to step 672 where it stops TIMER_5 and then proceeds to step 648 in FIG. 6B to again wait for responses from the HOST.

If at step 664 an STX has been received, this indicates the start of a transaction from the TERMINAL, so at step 673 the routine continues to receive, test, and log characters into the receive buffer while looking for the end of the transaction character ETX followed by the LRC. At step 674 the routine determines if a valid transaction has been received by determining if the received LRC is valid. If a valid transaction has not been received, at step 676 the NETWORK sends an NAK to the terminal indicating as much, and proceeds to step 677 where it determines if the maximum NAK count has been reached. If so, the process disconnects starting at step 614. Otherwise, it proceeds to step 662 to wait for a valid transaction from the TERMINAL.

If at step 674 a valid transaction was received, the NETWORK sends an ACK character to the TERMINAL and resets the NAK count at step 678, stops TIMER_5 at step 680, sends that transaction on to the HOST at step 682, increments the outstanding transaction counter at step 684, and restarts or starts TIMER_2 at step 686. The routine then goes to step 648 in FIG. 6C to wait for responses from the HOST.

Figure 6E:
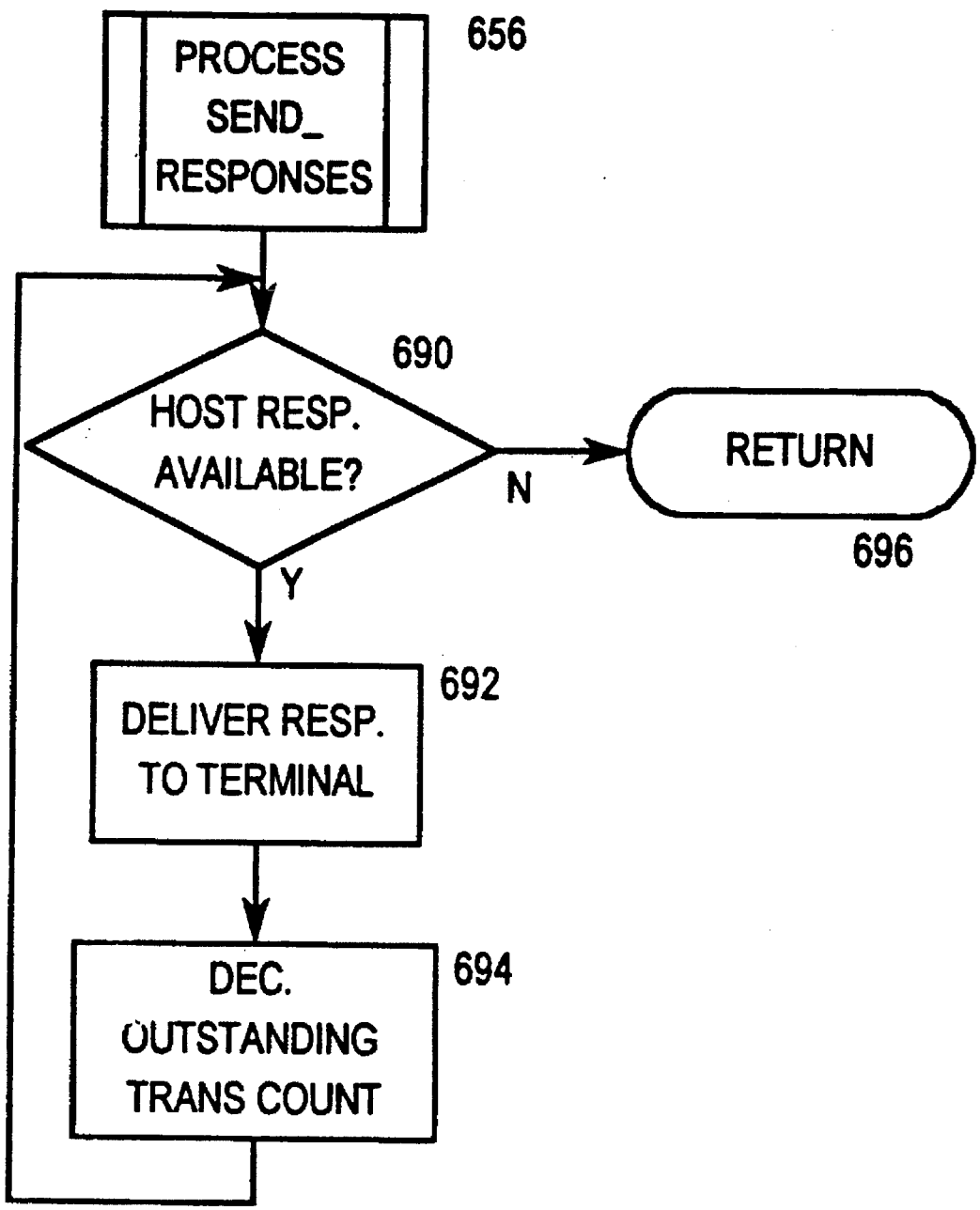

In FIG. 6C, at step 656, a SEND_RESPONSES routine was executed whose purpose was to send all available responses from the HOST to the TERMINAL. The flow of this routine is shown in FIG. 6E. The process SEND_RESPONSES 656 first determines if a HOST response is available at step 690. If so, it delivers that response to the TERMINAL at step 692 and decrements the outstanding transaction counter at step 694. It then again loops to determine if another HOST response is available at step 690. If at step 690 a HOST response is not available, the routine returns at step 696 and then proceeds to step 658 as no more HOST responses are currently available.

Software for Multi-Threaded Transactions with Interleaved File Transfer

FIGS. 7A–D and 8A–E show flowcharts of software used in a POS system as shown in FIG. 4 for providing multi-threaded authorization transactions from the terminals 12, 14, and 16 through the controller 24 interleaved with file transfers. This software is similar to the software previously described in relation to FIGS. 5A–B and 6A–E, but the capability of interleaving file transfers has been added. The software is constructed such that any authorization requests from the TERMINAL, here the controller 24, and authorization responses from the bank card host 54, the debit host 56, or any internal proprietary host software in the FEP/host 29 (the HOST) take priority over any file transfers between the NETWORK and the HOST. Thus, in practice, file transfers can take place in the background while normal authorization requests and responses take place in the foreground without interrupting normal customer service.

File uploads and downloads require an additional special character for the transfer protocol, an Alt-ACK character. This character, when sent by the receiver of a file transfer, directs the sender to temporarily suspend file transfer to allow an authorization transaction, or a response to such a transaction, to be sent.

Figure 9:
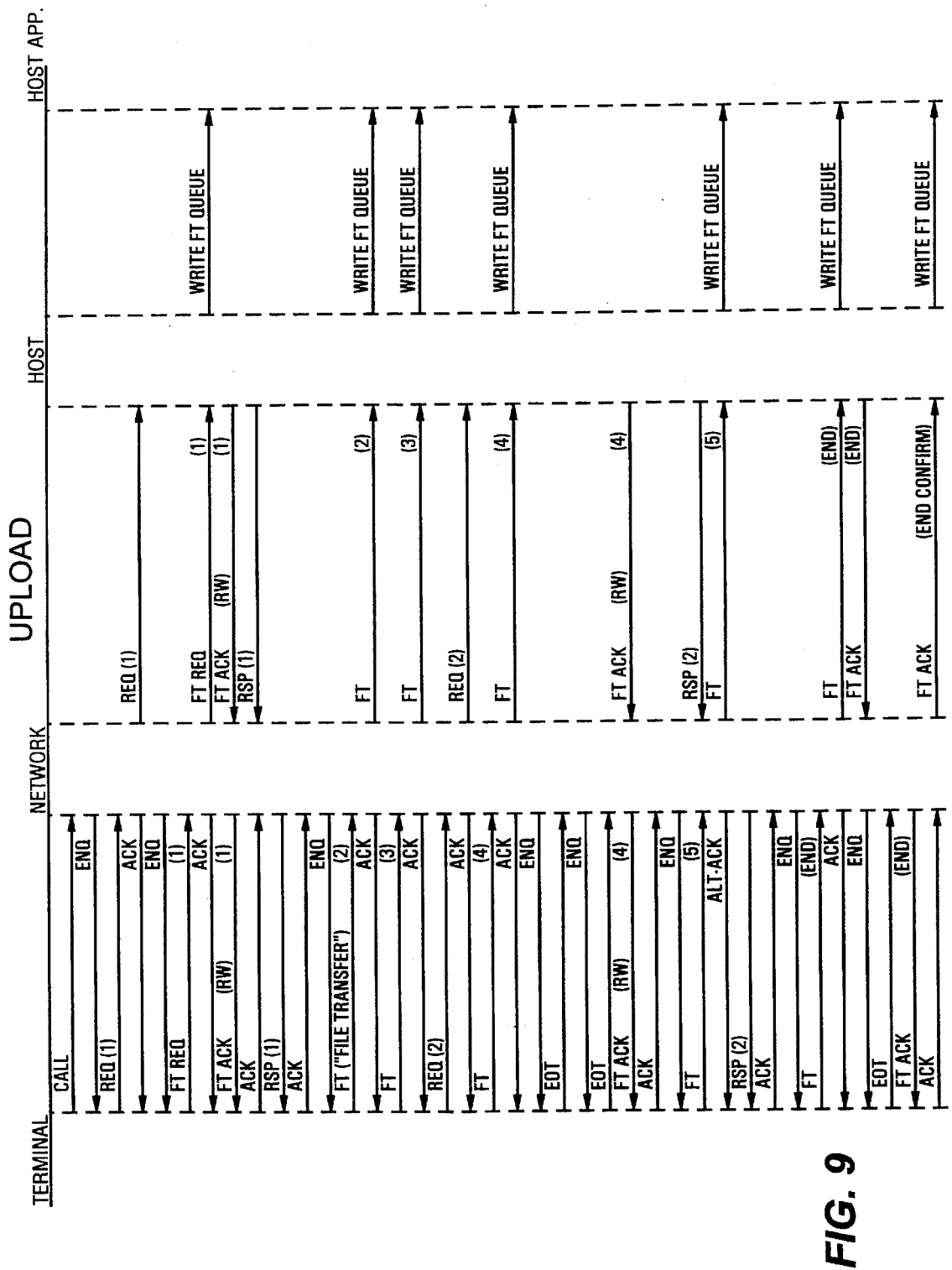
FIGS. 9 and 10 are message flow diagrams for multi-threaded transactions and interleaved file transfers in a POS system according to the invention.
Figure 10:
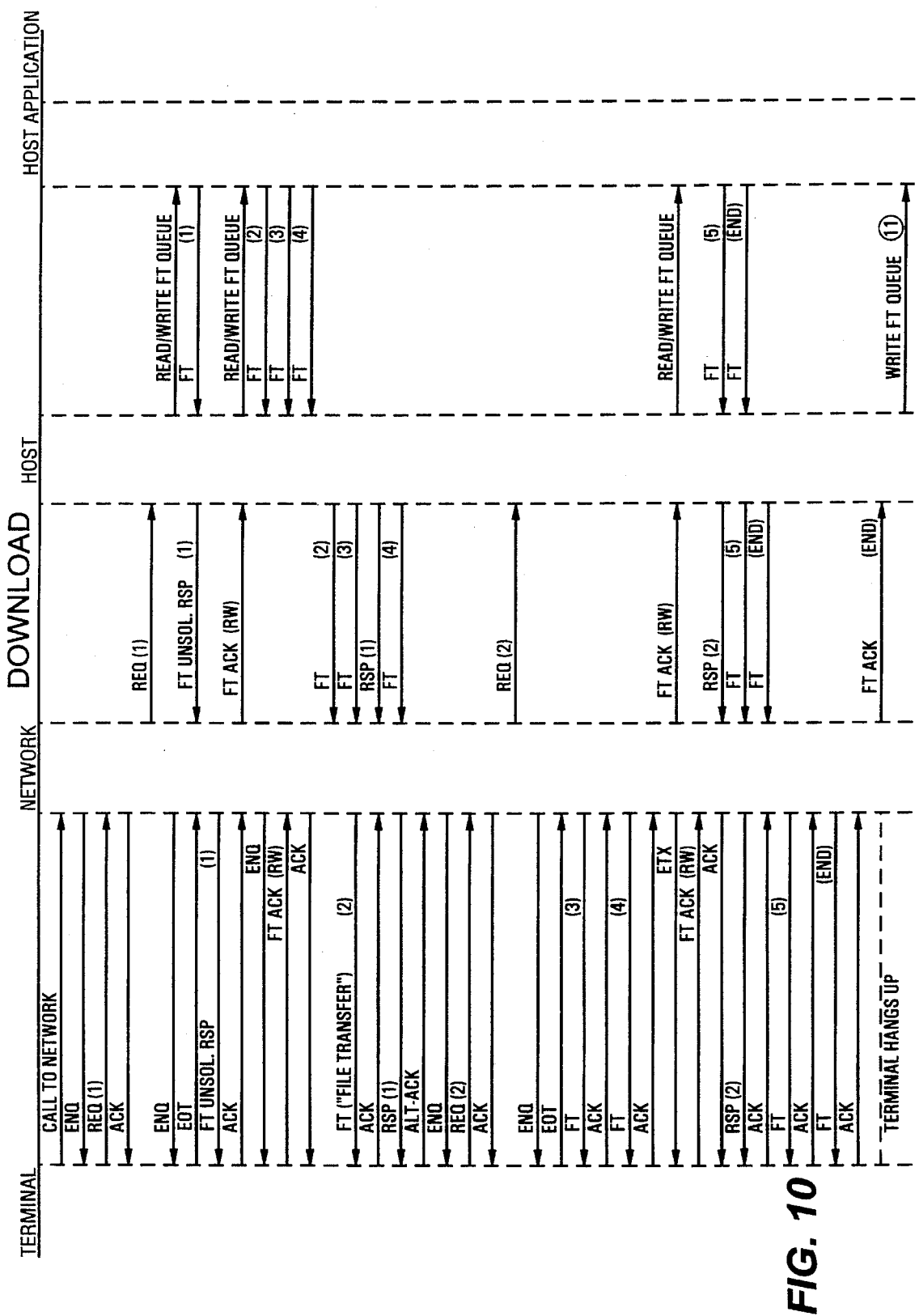

FIGS. 9 and 10 are diagrams showing exemplary cases of the message flow between the TERMINAL, the NETWORK, and the HOST during both file uploads and file downloads. In FIGS. 9 and 10, RW is the record window (or receive limit) size, FT represents a file transfer record, and FT Req represents a file upload or download request. Further, a number in parenthesis next to a POS request (Req) or POS response (Rsp) represents the sequential number of that request or with which request the response is associated. A number in parenthesis next to a FT (file transfer) message indicates which sequential file transfer record the message represents. In the embodiment of FIGS. 9 and 10, the TERMINAL initiates uploads and the NETWORK initiates downloads. The protocol could instead allow either the TERMINAL or the NETWORK to initiate either type of transfer, but this is not necessary; if the TERMINAL desires a download, it can request that download by sending a message to the appropriate HOST in the form of a transaction request. Then, the HOST initiates the desired download through the NETWORK.

TERMINAL Control Software for Multi-Threaded Transactions with Interleaved Batch File Transfer FIGS. 7A–D show a flowchart of software used by the controller 24, or the TERMINAL, for allowing multi-threaded transactions while allowing interleaved file transfers. Inherent in this software is the capability for single-threaded transactions, as shown in FIG. 3.

The process TERM 700 begins at step 702 by dialing and logging on to the NETWORK if a login is required. Again, a true dial-up is not necessary as any communications link will suffice. The process waits for an ENQ from the NETWORK at step 704, and once received proceeds to step 706.

At step 706, the procedure determines if a file upload from the TERMINAL to the NETWORK is in progress. If so, the routine at step 708 determines if the file upload has been suspended and if a pacing response has been received from the HOST or the TERMINAL to NETWORK send limit has not been reached.

A pacing response relates to send and receive limits associated with file transfers. For an upload, the TERMINAL sends a file up a logical record at a time. The NETWORK then stores that record in a file upload queue established for that file and sends an ACK indicating normal receipt of the record. To maintain synchronization between the TERMINAL, the NETWORK, and the HOST, however, the TERMINAL can only send an arbitrary number of records (the TERMINAL to NETWORK send limit) before the TERMINAL must wait for an acknowledge message from the NETWORK. This acknowledge message, which is a standard STX/ETX message, is a pacing response. Then the TERMINAL knows the status of the file upload queue in the NETWORK, and so stops when the arbitrary number of records have been passed. When the NETWORK is again ready to receive file upload records, it sends the acknowledge message to the TERMINAL, and this acknowledge message includes as a field the next arbitrary number of records to upload. This pacing response directs the TERMINAL to continue with its upload.

So, if at step 708 file upload has been suspended and a pacing response has been received (in the form of a message sent from the NETWORK), the NETWORK is ready for further records of the file upload, and so the routine unsuspends the file upload at step 710 and clears the send limit counter.

Further at step 708, if file upload has been suspended and the send limit has not been reached, this indicates that file upload was suspended by an ALT-ACK sent from the NETWORK to the TERMINAL. The ALT-ACK was sent, as will subsequently be described, to suspend the file upload so that the NETWORK could send a response from a HOST to the TERMINAL. In such a situation, the next ENQ from the NETWORK unsuspends file upload, and as this point in the routine can only be reached by an ENQ being received from the NETWORK, the routine at step 710 unsuspends file upload, assuming the send limit has not been reached. If at step 706 no file upload is in progress, or at step 708 no pacing response has been received and the send limit has been reached, or after step 710, the routine proceeds to step 712.

At step 712, the TERMINAL software gets the next application request from the queue. This would typically be an authorization request from one of the terminals 12, 14, or 16, but could also be an upload request or record, or an acknowledgement of a download request from the controller 24, for example. The TERMINAL prioritizes the POS authorization requests, the upload request or records, and the download acknowledgements within this queue; POS authorization requests take priority over all other requests or acknowledgements. At step 714, the process determines if the request is a file upload record or a request for a file upload. If so, the routine at step 716 determines if file upload has been suspended. If so, the routine sends an EOT character at step 718, which informs the NETWORK that no transaction is pending, and proceeds to step 704 to wait for another ENQ character from the NETWORK.

If file upload has not been suspended at step 716, the routine builds the proper NETWORK file upload record or request packet and sends that packet at step 720. This is done by forming a standard STX/message/ETX/LRC sequence and sending it to the NETWORK. The NETWORK will then respond to the upload request, first by sending an ACK to the TERMINAL and then by either sending the request to the appropriate HOST or preparing to receive an upload itself. After sending this packet, the routine proceeds to step 722, where it determines if the packet was a file upload record and if that record was the end of the file. If so, the routine proceeds to step 724, where a flag is set to specify that file upload is no longer in progress.

After this packet has been sent, the routine proceeds to step 726, which is also where control proceeds from step 722 if not a file upload record or not at end of file. In step 726, the routine determines whether this transaction is a file upload request. If so, the routine, at step 728, sets an upload in progress flag, but suspends that upload and sets the send limit count to the send limit. These latter two actions ensure that upload will not be unsuspended at step 710 until a pacing response is received from the NETWORK, as a pacing response is necessary to reinitiate the upload.

From step 726 or step 728, the routine proceeds to step 730, where the network communications buffer is flushed. The network communications buffer is simply a first-in, first-out input buffer.

If at step 714 the application request was not for a file upload, the routine proceeds to step 732, where it determines if the application request is a download acknowledge. A download acknowledge is an acknowledgement of a download request from the NETWORK, and includes as a parameter the download receive limit for the TERMINAL. This receive limit specifies the number of records to be sent by the NETWORK to the TERMINAL before the TERMINAL must send another download acknowledge message. If at step 732 the application request is a download acknowledge, then that acknowledge message is sent, including the receive limit, to the NETWORK at step 734. The transmittal of a download acknowledge also signals the resumption of the download, so download is unsuspended. From step 734, the routine proceeds to step 730, where the NETWORK communications buffer is flushed.

If at step 732, the application request was not a download acknowledge but was instead for an authorization request, the routine proceeds to step 736, where it builds the proper NETWORK request packet and sends that request to the NETWORK. This is a normal STX/message/ETX/LRC, and the message requests authorization from the appropriate HOST. Then, at step 738, the routine starts a response timer for this request. Each request has its own response timer, which can be individually adjusted depending on the type of request. For example, the response timer for an upload request is typically longer than the response timer for an authorization request, because an upload response does not occur until the window limit is reached or an end-of-file (EOF) is sent. Once this response timer is started, the network communications buffer is flushed at step 730, and the routine proceeds to step 740 in FIG. 7B.

Figure 7A:
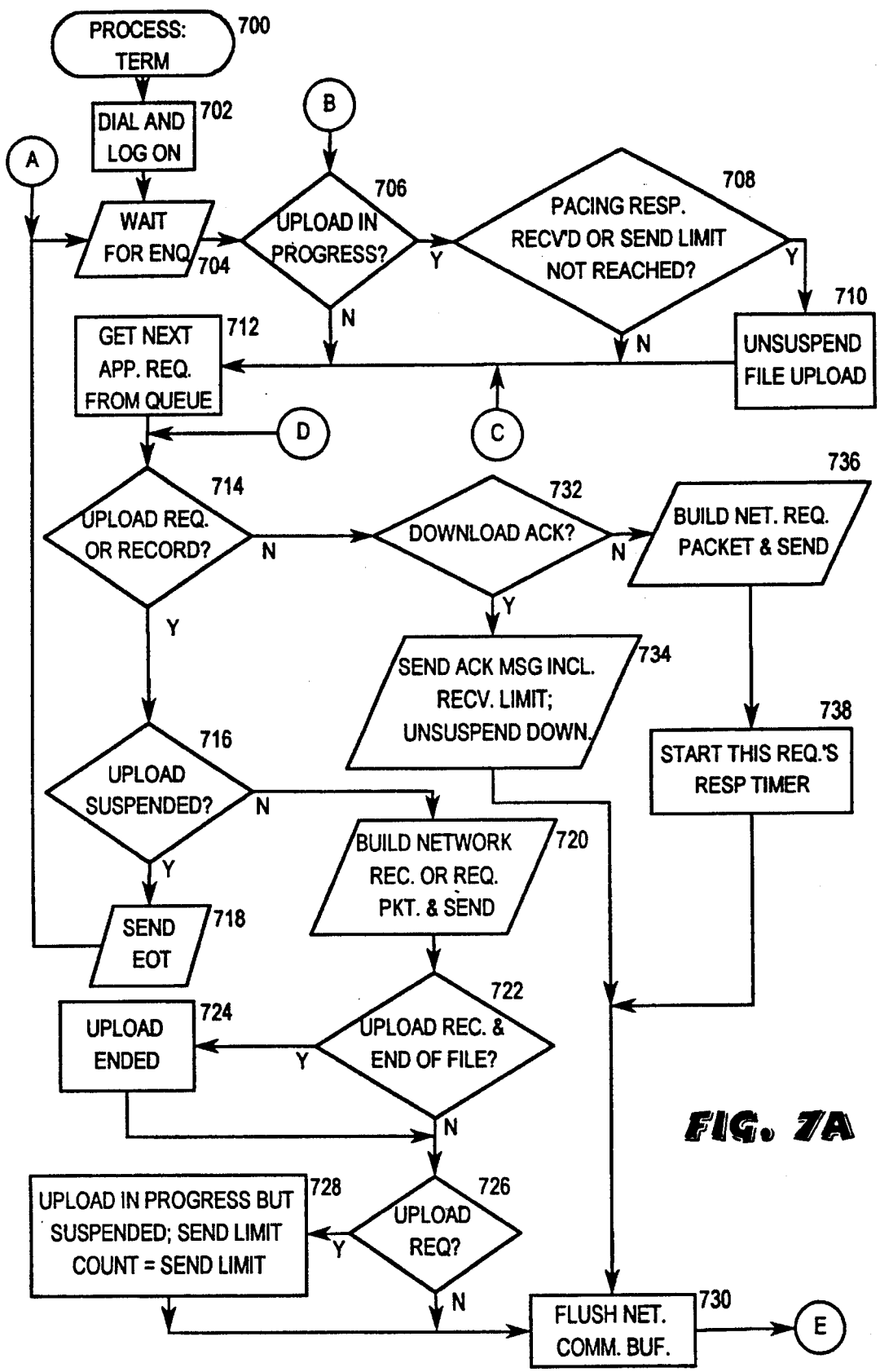
FIGS. 7A–D show a flowchart of software used in a store controller for connection to a POS system which implements both multi-threaded transactions and interleaved file transfers.
Figure 7B:
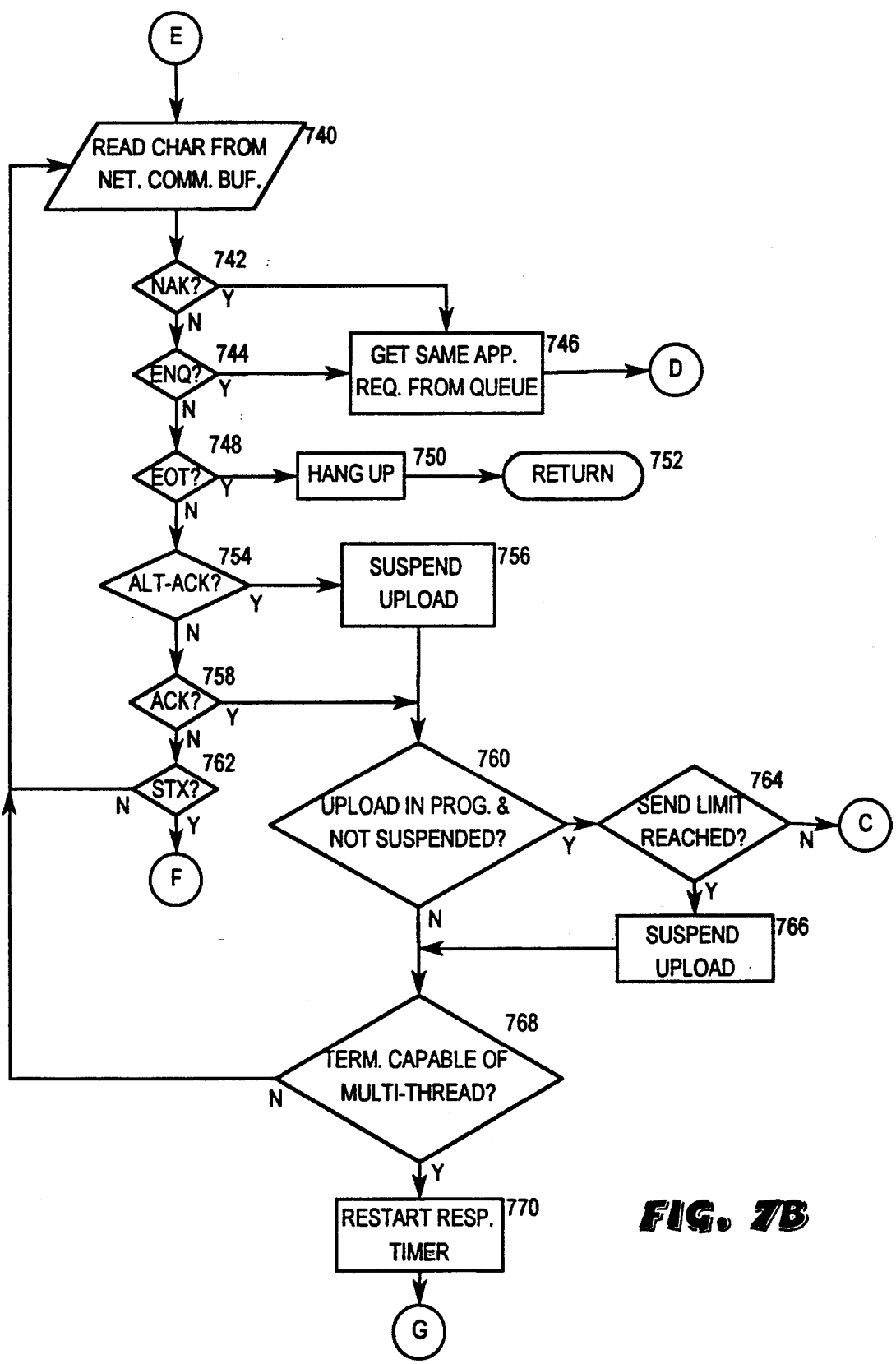

Turning to FIG. 7B, at step 740 the TERMINAL reads a character from the network communications buffer and proceeds to compare it to a number of possible responses. At step 742, the routine determines if the response from the TERMINAL was an NAK character, and at step 744 the TERMINAL determines if the response was an ENQ character. If either was so, this indicates the transmission was not properly received by the NETWORK, so the routine proceeds to step 746 and gets the last transmitted application request from the queue. The same application request is then again processed and transmitted to the NETWORK starting at step 714.

At step 748, the routine determines if an EOT has been transmitted by the NETWORK. If so, this indicates that the TERMINAL should terminate the connection, so it hangs up at step 750 and returns at step 752.

If, at step 748, the character was not an EOT, the routine proceeds to step 754, where the TERMINAL determines whether an ALT-ACK character has been received from the NETWORK. The ALT-ACK character indicates that any current file upload should be suspended. This would be necessary, for example, if a response from the HOST was currently pending in the NETWORK to send to the TERMINAL. In such a case, at step 756, the process suspends file upload.

Figure 7C:
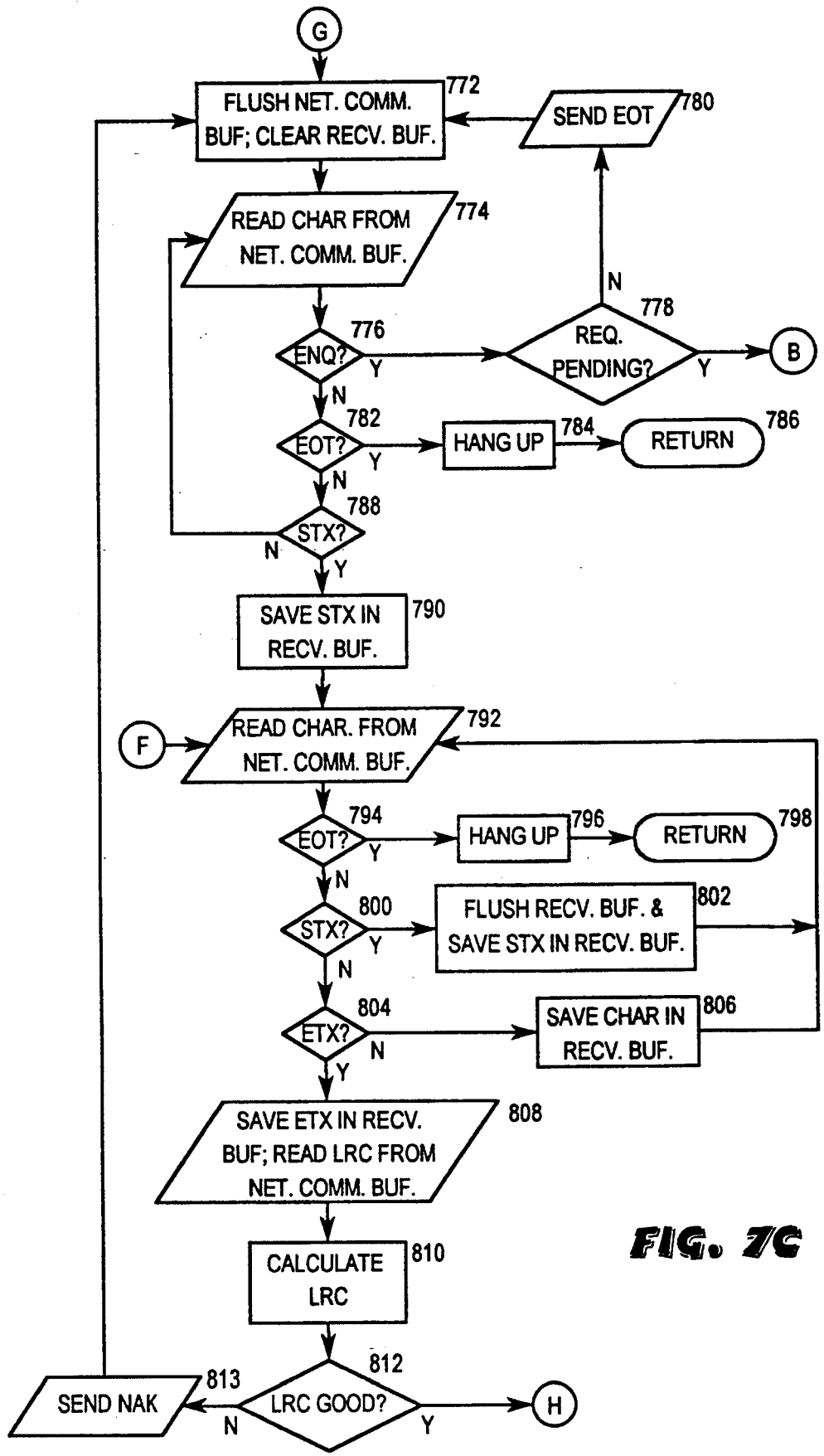

At step 758, the routine determines whether an ACK has been sent by the NETWORK. This indicates proper receipt of the transmitted transaction. From both steps 756 and 758, the routine proceeds to step 760, as will be described later. If, at step 758, the response was not an ACK, the routine proceeds to step 762, where it determines if the NETWORK has sent an STX. If so, this is the beginning of a message from the NETWORK, and so the routine proceeds to step 792 to receive that message, as shown in FIG. 7C. Otherwise, the routine again proceeds to step 740 to read a character from the network communications buffer, as no valid character was received.

Turning to step 760, this portion of the flowchart is entered if a transmission has been acknowledged as properly received by NETWORK transmissions of either an ACK or an ALT-ACK. At step 760, the routine determines if an unsuspended file upload is in progress. If so, the routine at step 764 determines if the send limit has been reached. This is done with a counter, and the send limit is set to the arbitrary number of file upload records that can be received by the NETWORK before the NETWORK must send an upload acknowledge message, or pacing response, to the TERMINAL, as previously discussed. If the send limit has been reached, the routine at step 766 suspends file upload as it must receive an upload acknowledge message, which includes the NETWORK receive limit (which is the TERMINAL send limit) before the TERMINAL can resume file upload. Else, the routine proceeds to step 712, shown in FIG. 7A, to get the next application request from the transaction queue.

If an unsuspended file upload is not in progress at step 760 or file upload was suspended at step 766, the routine proceeds to step 768, where it determines if the terminal is a multi-threaded type terminal. Such a terminal, as previously mentioned, is capable of multi-threaded transactions. If not, the routine proceeds to step 740 to wait for a response from the NETWORK. If it is a multi-threaded type terminal, the TERMINAL can send other messages and file upload records while waiting for a response to this transaction, so the routine proceeds to step 770, where the response timer for this transaction is restarted.

Turning to FIG. 7C, the routine proceeds to step 772, where the network communications buffer is flushed and the receive buffer is cleared. The receive buffer is a memory buffer in which a response from the terminal is assembled and verified before being sent to the appropriate application.

At step 774, a character is read from the network communications buffer. At step 776, this character is compared to ENQ, which would indicate a poll from the NETWORK. If the character is an ENQ, the routine at step 778 determines if any transaction requests, upload requests, upload records, or download acknowledgments are pending in the transaction queue. If not, the routine at step 780 sends an EOT, indicating the TERMINAL has no more transaction requests pending in the transaction queue, and then control proceeds to step 772. If requests are pending at step 778, the routine proceeds to step 706, shown in FIG. 7A, to process the next transaction request.

If at step 776 an ENQ character was not received, the character from the NETWORK is compared with EOT at step 782. An EOT instructs the TERMINAL to hang up, so if an EOT has been transmitted, the routine hangs up at step 784 and returns at step 786 to wait for the next transaction. If an EOT was not received, the routine proceeds from step 782 to step 788, determining if the character received was an STX. If so, the routine saves the STX character in the receive buffer at step 790 and proceeds to handle this message from the NETWORK at step 792, as will be described below. An STX character indicates the beginning of a downline message transmission from the NETWORK to the TERMINAL. If at step 788 an STX character was not received, the routine loops to step 774 to read another character from the network communications buffer.

If an STX character was received from the NETWORK at step 788, the routine proceeds from step 790 to step 792. This portion of the flowchart is entered if the NETWORK is transmitting a message to the TERMINAL. At step 792, the NETWORK reads a character from the network communications buffer and at step 794 compares it with EOT. As previously described, if this character is an EOT, the TERMINAL hangs up at step 796 and returns at step 798.

If at step 794 the character received was not an EOT, the character is compared to STX at step 800. If an STX, this STX has occurred between the message's initial STX and the terminal ETX. Such an intermediate STX is treated as a protocol violation, so the TERMINAL attempts to resynchronize by flushing the receive buffer and saving this STX at step 802, and starting the receive message loop again at step 792.

If an STX is not received at step 800, the character is compared to an ETX at step 804. If not an ETX, this character is part of the message transmission from the NETWORK, so the character is saved in the receive buffer at 806 for processing as a message transmission, and the next character is read in the loop at step 792.

If the character is an ETX at step 804, this indicates the end of the message from the TERMINAL. So, at step 808, the ETX is saved in the receive buffer and the next character is read from the network communications buffer. The character following an ETX is the linear redundancy check- (LRC) character. Redundancy checking is performed on each message to help ensure that the message was not corrupted during transmission. Numerous other methods of detecting such errors as are well known to those skilled in the art could be used in the place of LRC. The redundancy check result in any arbitrary number of bytes, but here the LRC is one byte. At step 810, the LRC is calculated from the transmitted message. At step 812, if the LRC is not good, the routine proceeds to step 814, where it sends an NAK and proceeds to step 772.

Figure 7D:
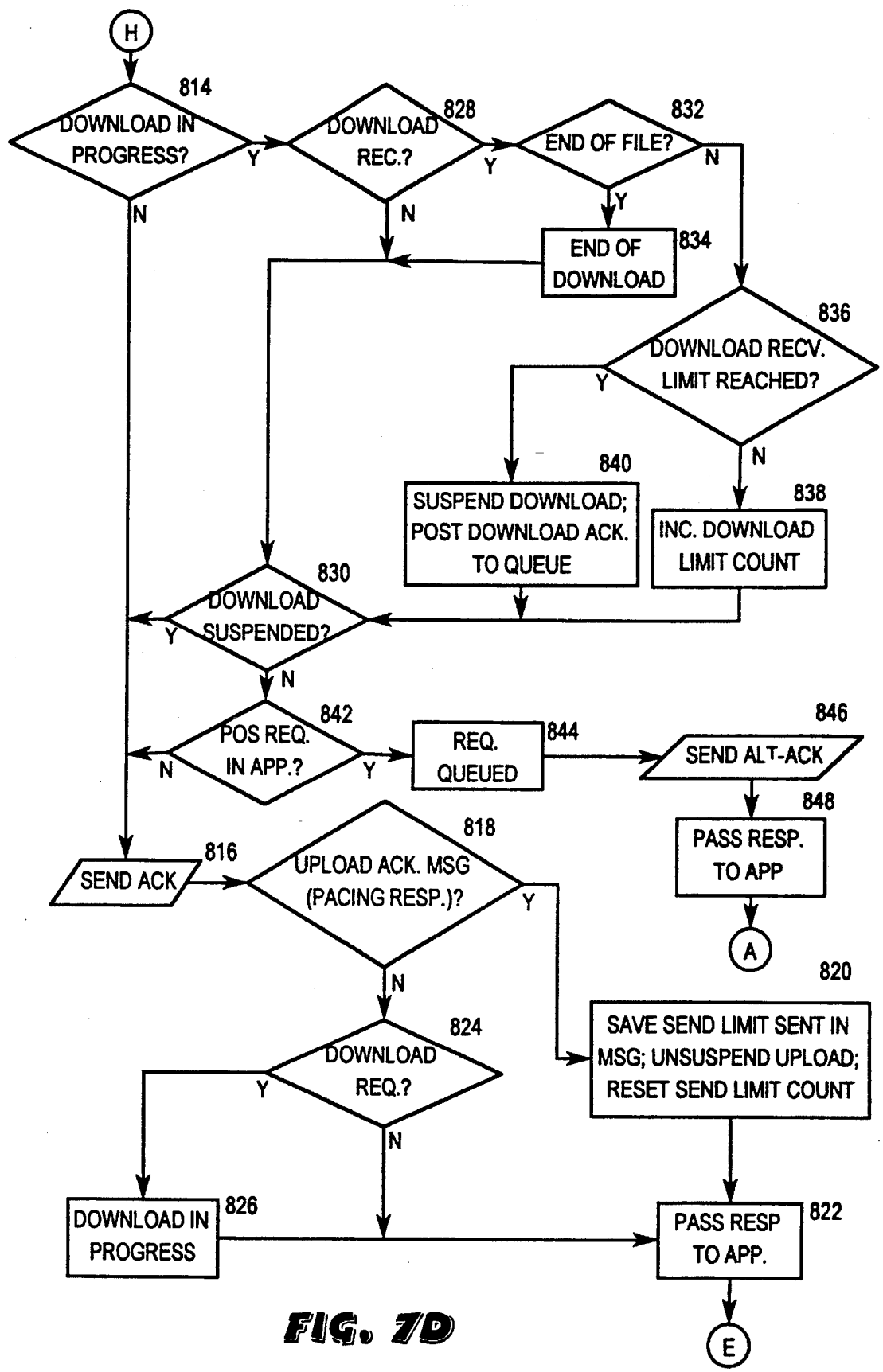

Else, turning to FIG. 7D, if the LRC 814 at step 812 was good, the routine proceeds to step 814, where it determines if a file download is in progress. A file download would be coming from the NETWORK to the TERMINAL. If no file download is in progress, the routine sends an ACK to the NETWORK to acknowledge receipt of the transmitted message at step 816, and then proceeds to step 818, where it determines if the receive message was an upload acknowledge message. An upload acknowledge message, or pacing response, is sent by the NETWORK when the TERMINAL has sent the send limit number of upload records and the NETWORK is again ready to receive another group of upload records, or to initiate an upload. The upload acknowledge message includes a parameter that specifies the number of records the TERMINAL is to send before again awaiting another upload acknowledge message; this value becomes the send limit. So if an upload acknowledge message is received at step 818, the routine proceeds to step 820, where it saves the send limit sent in the upload acknowledge message and unsuspends file upload. Further, it resets the send limit count, which is used in steps 708 and 764 to determine if the send limit has been reached. The routine then proceeds to step 822, where it passes the response, here an upload acknowledge message, to the appropriate application.

If at step 818 the message was not an upload acknowledge message, the routine proceeds to step 824, where it determines whether the message was a download request. If not, the message is passed to the appropriate application in step 822. Otherwise, the routine proceeds to step 826, where the download in progress flag is set to true. Then, at step 822, the download request is passed to the appropriate application, which will post a download acknowledge message to the transaction queue when it is ready to receive records from the NETWORK. At this point, however, download is suspended, and will not be unsuspended until the download acknowledge message is sent to the NETWORK. After passing the response to the appropriate application as step 822, the routine proceeds to step 740 to get the next character from the NETWORK.

If at step 814 a file download is in progress, the routine proceeds to step 828, where it determines if this received message is a download record. If not, the routine proceeds to step 830. If so, however, the routine proceeds to step 832 where it determines if this download record is the end of the file. If so, the routine proceeds to step 834, where the download in progress flag is set to false, as the download has ended.

If, at step 832, this record is not an end of file, however, the routine proceeds to step 836, where it determines if the download receive limit has been reached. If not, the counter for the download receive limit is incremented at step 838 and the routine proceeds to step 830. If the receive limit has been reached at step 836, however, download is suspended at step 840 and a download acknowledge is posted to the transaction queue. This download acknowledge will be sent after any POS request, and signals to the NETWORK to resume sending download records. In any case, the routine then proceeds to step 830.

At step 830, the routine determines if file download is suspended. If so, then ACK is sent at step 816. If file download is not suspended, however, the routine at step 842 determines if there is a POS request in an application; that is, if an authorization request is pending in the transaction queue. If not, the routine proceeds to step 816 as previously described.

If at step 842 a POS request (i.e., an authorization request) is in the application, this indicates that although a file download is in progress, one of the terminals connected to the controller 24 desires to pass an authorization request upline to the HOST. So, at step 844, the POS request is queued into the transaction queue. Then, at step 846, an ALT-ACK is sent to the NETWORK from the TERMINAL. This instructs the NETWORK to halt its file download so that the TERMINAL can transmit its authorization request upline to a HOST. At step 848, the response message is passed to appropriate application, and the routine again returns to step 704 to wait for the next ENQ from the NETWORK, whereupon it will send the pending authorization request.

NETWORK Control Software for Multi-Threaded Transactions with Interleaved Batch File Transfer The NETWORK software in the FEP/host 29 must be capable of suspending downloads in order to implement interleaved file transfers, as well as handling interleaved transactions. This corresponds to the TERMINAL's capability of suspending uploads and multi-threading.

FIGS. 8A–E show a process NETWORK 900 to be run on the FEP/host 29. As discussed in relation to FIGS. 6A–D, an identical process is run for each TERMINAL process connected to the FEP/host 29.

The process NETWORK 900 begins at step 902 by setting an ENQ_CNT variable to four. The ENQ_CNT variable sets the number of inquiries that can be sent to the TERMINAL with no response before the NETWORK terminates the connection.

At step 904, the NETWORK sends the TERMINAL an ENQ, at step 906 the NETWORK starts a TIMER_1, which is a timeout for receiving a response from the TERMINAL, at step 908 the process decrements the ENQ_CNT variable, and at step 910 the process flushes its terminal communications buffer, which is simply the input buffer for characters from the TERMINAL, and corresponds to the network communications buffer in the TERMINAL.

At step 912, the process determines if the character has been received. If not, the routine proceeds to step 914 where it determines if TIMER_1 has expired. If not, the routine loops back to again determine if a character has been received at step 912. If TIMER_1 has expired at step 914, the routine at step 916 determines if the ENQ_CNT variable has reached zero. If not, the routine loops back and sends another ENQ at step 904.

If the ENQ_CNT variable is zero at step 916, the arbitrarily set number of maximum number of nonresponsive inquiries has been sent, so at step 918 the routine sends an EOT to the TERMINAL, which signals the TERMINAL that an error has occurred and causes the TERMINAL to hang up. Then, at step 920, the NETWORK terminates the connection, and at step 922 the process ends.

If a character has been received at step 912, the routine proceeds to step 924, where it reads a character from the terminal communications buffer. If at step 926 this character is an EOT, this indicates that the current TERMINAL has no transactions to send to the NETWORK, so the routine then proceeds to step 928 to determine if a download is in progress.

If a download is in progress, the routine proceeds to step 930, where it determines if downloading has been suspended and the NETWORK to TERMINAL send limit has not been reached. If this condition is true, this indicates that download was suspended by the TERMINAL sending an ALT-ACK, which indicates that a POS authorization request is pending from the TERMINAL. In such a situation, the suspension is terminated by receipt of an EOT character from the TERMINAL. Thus, if at step 930 the send limit is not reached, the routine is in an ALT-ACK type download suspension, but an EOT has been received at step 926, so the routine proceeds to step 932, where it unsuspends download. In either case, the routine then proceeds to step 996 to be described later.

If, at step 928, a download is not in progress, the routine at step 934 determines if there are any outstanding transactions pending from the HOST by comparing an outstanding transaction counter to zero. That is, the TERMINAL has previously sent authorization requests, and the NETWORK has not yet sent responses. If so, then the routine proceeds to step 996. If not, however, the routine at step 936 determines if an upload is in progress. Again, if so, the routine proceeds to step 996. Otherwise, the routine proceeds to step 920, where it hangs up, as there is no current activity between the TERMINAL and the NETWORK.

If an EOT was not received from the TERMINAL at step 926, the NETWORK determines at step 938 whether an STX character was received. This character indicates the start of a message transmission from the TERMINAL. If no STX was received, the process loops to step 924 to read another character from the terminal communications buffer. Otherwise after an STX is received, the process reads the request up to the ETX along with the following LRC character from the terminal communications buffer at step 940.

At step 942, the process calculates the LRC based on the transaction transmitted from the terminal, and determines at step 944 whether the LRC was proper. If not, the transmission was bad, so the routine sends an NAK at step 946 and again loops to step 924 to read another character from the terminal communications buffer.

Figure 8A:
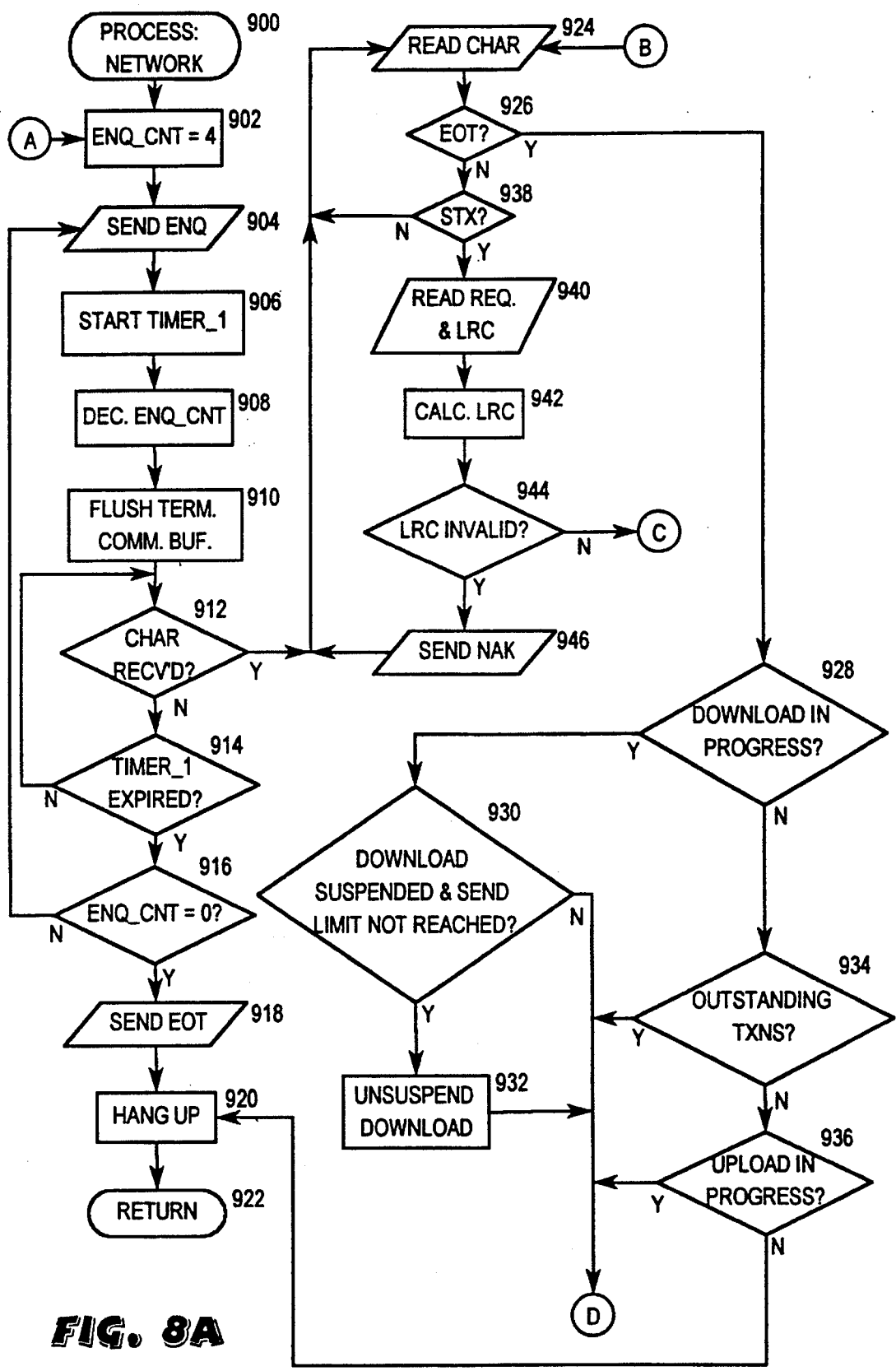
FIGS. 8A–E show a flowchart of software used in a front-end processor/host to implement both multi-threaded transactions and interleaved file transfers in a POS system according to the invention.
Figure 8B:
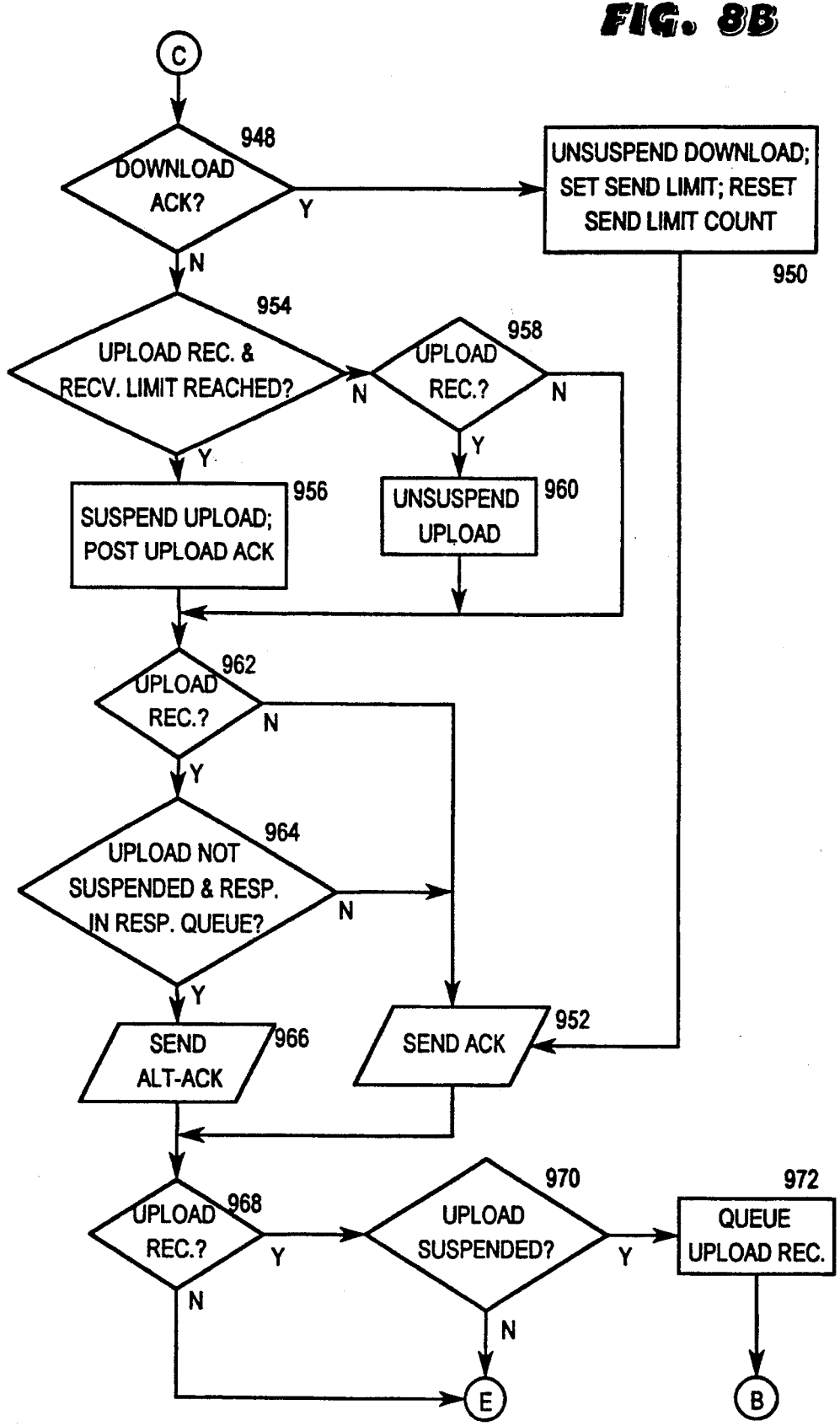

Turning to FIG. 8B, if the LRC was good at step 944, the routine proceeds to step 948, where it determines if the current received message from the TERMINAL is a download acknowledge. If so, the routine proceeds to 950, where it unsuspends download and sets the NETWORK to TERMINAL send limit to the parameters sent by the download acknowledge message. Further, it resets the send limit count. A download acknowledge message is received from the TERMINAL when the TERMINAL is ready to receive records of a download from the NETWORK after having previously receiving send limit number of records from the NETWORK, or at the start of a download. After step 950, the routine proceeds to step 952, where it sends an ACK to acknowledge proper receipt of the message.

If at step 948, the message received from the TERMINAL is not a download acknowledge, the routine proceeds to step 954, where it determines if the message received from the TERMINAL is a file upload record and the receive limit has been reached. If so, the routine suspends file upload at step 956. At step 956, the routine also posts an upload acknowledge to the HOST response queue (which contains transactions received from the HOST which are to be sent to the TERMINAL), which will be sent after all responses from a HOST have been downloaded to the TERMINAL.

If at step 954, the received message was not a file upload record or the receive limit was not reached, the routine proceeds to step 958, where it determines if the receive message was a file upload record. If so, the routine unsuspends file upload at 960, and in any case, from steps 956, 958, or 960, proceeds to step 962.

At step 962, the routine determines if the message sent was a file upload record. If not, the routine sends an ACK at step 952. Else, the routine, at step 964, determines if file upload is not suspended and a response is available in the HOST response queue. The HOST response queue contains all unprocessed messages that have been sent by the HOST. If so, this indicates the file upload must be suspended to allow the NETWORK to send an authorization response to the TERMINAL, so the routine proceeds to step 966 and sends an ALT-ACK. Else, the routine sends an ACK at step 952.

After sending ALT-ACK at step 966 or ACK at step 952, the routine proceeds to step 968, where it determines whether the message sent by the TERMINAL was a file upload record. If so, the routine at step 970 determines if file upload has been suspended, and if not, queues that upload record into an upload-to-HOST request queue at step 972. Control then passes to step 924, where another character is read from the terminal communications buffer as previously discussed. In this manner, the routine can rapidly upload a receive limit number records from the TERMINAL before uploading those records to the HOST.

Figure 8C:
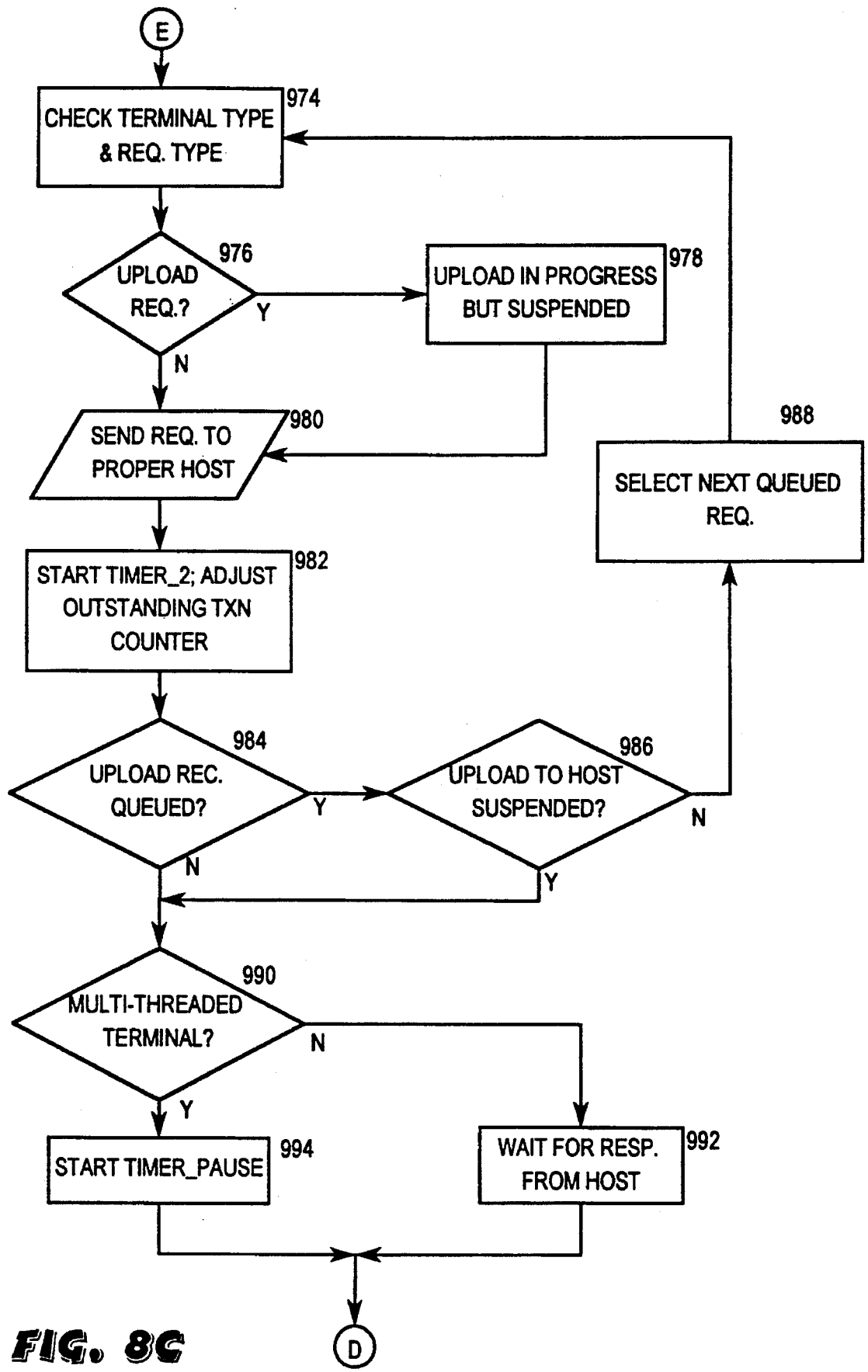

Turning to FIG. 8C, if the message from the TERMINAL was not a file upload record at step 968, or if file upload has been suspended at step 970, control passes to step 974. At step 974, the process checks the terminal type and request type. Then, at step 976, the routine determines if the request is a file upload request. If so, the routine proceeds to step 978, where it sets upload from terminal in progress to true, but suspended. Eventually, the HOST will send a file upload acknowledge, which will be passed on to the TERMINAL, thus initiating the file upload and unsuspending it at step 1008, described below. File upload to the HOST will not be suspended even though file records are queued if the HOST has sent an upload acknowledge record to the NETWORK, indicating that the NETWORK is to continue uploading file upload records. In either case, the routine then proceeds to step 980.

Based on terminal and request type determined at step 974, the process sends the request upline to the proper HOST at step 980. For example, referring now to FIG. 4, if the request is an authorization request for the bank card host 54, the NETWORK routes the authorization request to the bank card host 54. Similarly, if the request is a debit request from the debit host 56, the NETWORK routes that request that to the debit host 56. Finally, if the request is a proprietary transaction request, the routine sends the request via an interprocess call to proprietary HOST software also running on the FEP/host 29. An upload request or record is routed to the appropriate host, which either sets up a receive block for a file and then sends an upload acknowledge to the NETWORK, or stores the record. Then, at step 982 in FIG. 8, the routine starts a TIMER_2, and, if the transaction is a POS authorization request, starts increments an outstanding transaction counter. This timer ensures that a response is received from a HOST within a specified amount of time.

Proceeding to step 984, the routine determines if a file upload record has been queued in the upload to HOST request queue. This will have occurred if the receive limit of the HOST has previously been reached. If a file upload record has been queued, the process at step 986 determines if file upload to the HOST is suspended. This will be the case if no upload acknowledge has been sent from the HOST to the NETWORK since the HOST receive limit was reached. The communications link between the NETWORK and the HOST contains a receive window/pacing response protocol similar to that used between the NETWORK and the TERMINAL, although this NETWORK/HOST protocol is not explicitly shown. When the NETWORK has uploaded the HOST's receive limit number of records, the NETWORK must wait for the HOST to send an upload acknowledge. Similarly, when the HOST has downloaded the NETWORK's receive limit number of records, the HOST must wait for a download acknowledge from the NETWORK. This receive window, or send limit, size can be different from the sizes used between the TERMINAL and the HOST, but they are similarly transmitted in acknowledge messages. If upload to HOST was not suspended at step 986, the routine at step 988 selects the next queued file upload record and loops to step 974, where the terminal and request types are again checked, and at step 980, the queued record is sent to the proper HOST. Records will have been queued up at step 972, where the TERMINAL was reading a series of upload records while upload was not suspended.

If, however, at step 984, a file upload record has not been queued or at step 986 file upload to HOST is suspended, the routine proceeds to step 990, where it determines whether a multi-threading type terminal is currently being communicated with. Once again, a multi-threading type terminal is capable of multi-threaded transactions, while a single-threading terminal is only capable of single-threaded transactions.

If not a multi-threading terminal at step 990, the routine at step 992 simply waits for a response from the HOST. This is because the TERMINAL cannot send another transaction until it receives a response from the HOST.

If, however, a multi-threading terminal is being used at step 990, the routine at step 994 sets a TIMER_PAUSE and continues on. TIMER_PAUSE is a short delay to keep from polling the terminal too frequently. During this pause, the network can return one or all responses from the HOST to the TERMINAL. This action of the TIMER_PAUSE ensures that responses to previous requests have priority over new requests.

Figure 8D:
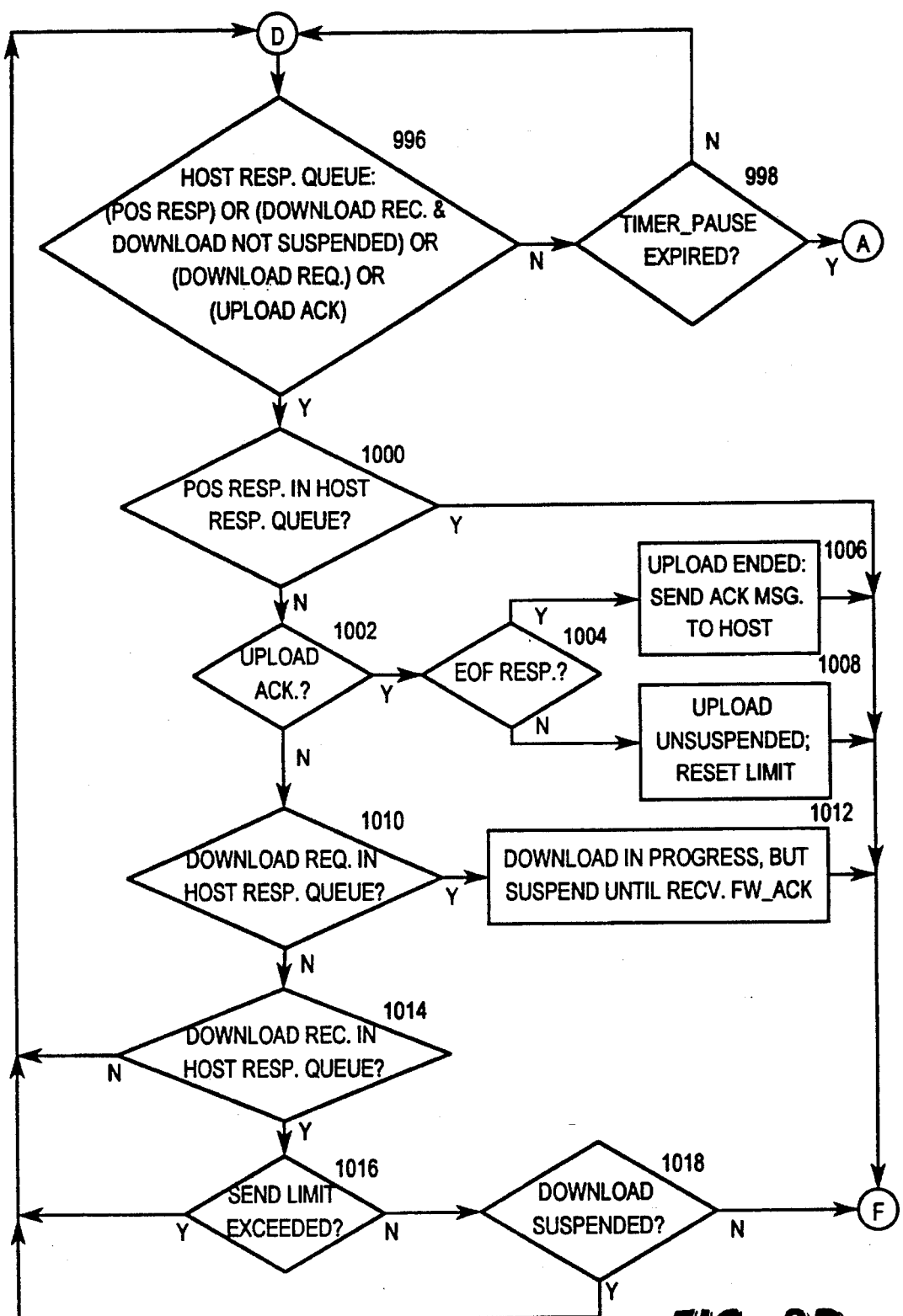

Turning to FIG. 8D, from either step 992 or 994, the routine proceeds to step 996, where it determines: if a response to an authorization request (i.e., a POS response) is in the HOST response queue; if a download record is in the HOST response queue and download is not suspended; if a download request is in the HOST response queue; or if an upload acknowledge is in the HOST response queue. If this condition is not true, the routine proceeds to step 998, where the process determines if TIMER_PAUSE is expired. If not, the routine again loops to step 996 for the previously described condition check. If TIMER_PAUSE has expired, however, indicating that the routine is ready to receive another transaction, the routine proceeds to the beginning, step 902, where the initial loop is again entered.

If the condition at step 996 is true, the routine proceeds to step 1000, where the routine determines if a POS response is in the HOST response queue. If not, the routine proceeds to step 1002, where it determines if a file upload acknowledge is in the HOST response queue. This would have been placed in the HOST response queue either by a HOST acknowledging a file upload request, or at step 956 by the NETWORK to resume file upload. If no file upload acknowledge is in the HOST response queue, the routine proceeds to step 1010. Otherwise, the routine proceeds to step 1004, where it determines if the file upload acknowledge is an end of file acknowledge. This is true when the last file upload record has been sent to the HOST, and the HOST is simply responding to acknowledge upload of the file. If so, then the routine proceeds to step 1006, where the upload in progress flag is set to false and an acknowledge is sent to the HOST.

If at step 1004, the acknowledge message is not an end of file response, then, at step 1008, upload is unsuspended, and the HOST receive limit transmitted with the upload acknowledge message becomes the HOST send limit variable, and the HOST send limit counter is reset to zero. These two variables are used to time the pacing responses that have been previously described. From both steps 1006 and 1008, the routine proceeds to step 1020, shown in FIG. 8E, where it sends to the file upload acknowledge message to the TERMINAL. Step 1020 generally sends messages to the TERMINAL. These messages contain the "tag along" header previously described, so the NETWORK does not have to route them, as the TERMINAL will take care of that based upon that "tag along" header.

If at step 1002, there are no file upload acknowledge messages in the HOST response queue, the routine proceeds to step 1010, where it determines if their are any download requests in the HOST response queue. If so, the routine at step 1012 sets the download in progress flag to true, but suspends download, as it will not begin downloading until it receives a download acknowledge from the TERMINAL. The download request is then sent to the TERMINAL at step 1020.

If at step 1010, no download request is in HOST response queue, the routine proceeds to step 1014, where it determines if any download records are in the HOST response queue. If not, the routine loops to step 996.

If at step 1014, download records are in the HOST response queue, the routine at step 1016 determines if the send limit has been exceeded. If so, then the routine cannot download these records until the TERMINAL sends a download acknowledge message, so the routine loops to step 996.

If at step 1016, the send limit is not exceeded, however, the routine proceeds to step 1018, where it determines if download is suspended. If so, such as if an ALT-ACK has been sent from the TERMINAL, the routine loops to step 996.

Figure 8E:
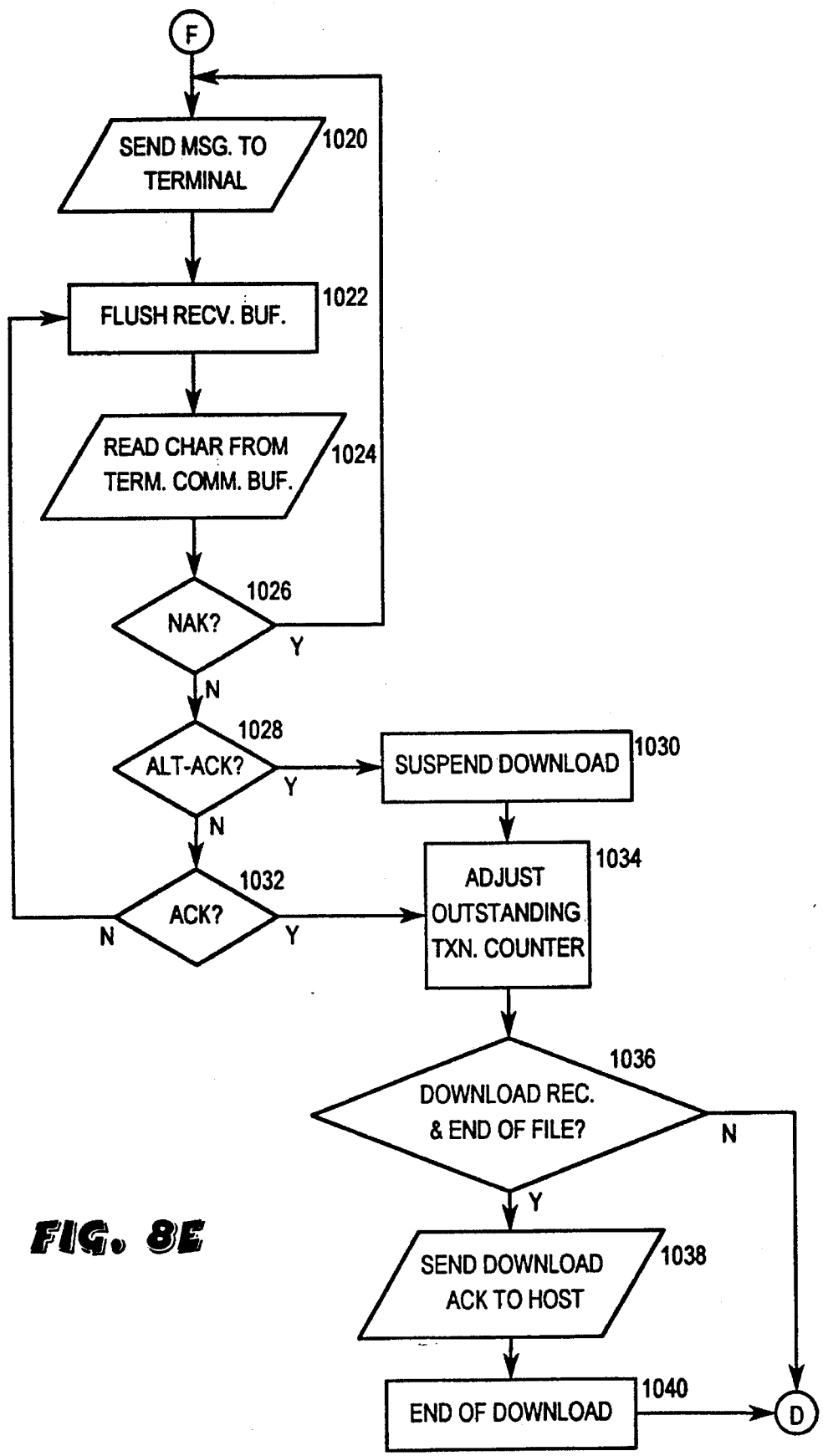

Turning to FIG. 8E, from step 1018 the download record is sent to the TERMINAL at step 1020.

From step 1020, the process proceeds to step 1022, where it flushes its receive buffer, and then proceeds to step 1024, where it reads a character from the terminal communications buffer.

If the process has received an NAK, as determined at step 1026, it proceeds to step 1020 to again send the same response previously sent to the TERMINAL, because the TERMINAL has indicated that it did not properly receive the message as indicated by an invalid LRC.

If the character received is determined at step 1028 to be a ALT-ACK, then the TERMINAL has indicated that download is to be suspended, so the process suspends the download at step 1030, and then proceeds to step 1034. If not an ALT-ACK character, the routine proceeds to step 1032.

If at step 1032 the character is determined to be an ACK, this is a simple acknowledgement of the message received from the NETWORK. Whether ACK at step 1032 or ALT-ACK at step 1028, the routine arrives at step 1034, where, if the transmitted message was a POS response, it decrements the outstanding transaction counter.

Then, at step 1036, the routine determines if the message sent to the TERMINAL is a download record and is the end of a file. If not, the routine loops to step 996. Otherwise, the routine proceeds to step 1038 where it sends a download acknowledge message to the HOST. This is an acknowledgement that the TERMINAL has properly received the download file. Finally, at step 1040, download is ended, and the appropriate flags are set to false. The routine then proceeds to step 996, where it examines the HOST response queue.

Timers

As previously discussed, a number of timers are typically implemented in both the NETWORK and the TERMINAL software in either a multi-threading or a multi-threading plus interleave POS system. These timers are obvious to one skilled in the art of designing POS network systems and some have not been shown in the flowcharts for reasons of clarity. The following timers are typical of those implemented in such a system. A timer is started when a transaction is sent from the NETWORK to the HOST. If it timed out before a response was received, appropriate error routines can be executed, as a HOST had failed to respond to an authorization request. An individual timer could be set for each transaction, or one timer could be set for all transactions pending in a particular HOST.

A pause timer, shown as TIMER_PAUSE regulates how frequently the TERMINAL is polled by the NETWORK. This would typically be between 0.1 and 15 seconds. Such a delay may be necessary because some POS terminals may not be able to serve a polling interrupt as frequently as the NETWORK would send that poll. The TIMER_PAUSE also ensures that responses are given priority over the solicitations of new transactions.

The TERMINAL maintains a unique response timer for each transaction pending at the NETWORK. Then, if that timer expires, the TERMINAL can appropriately handle the error condition for that particular transaction.

For file transfers, a file transfer timer would be started, especially in the NETWORK, for each particular file transfer, either upload or download. This would be a rather long timer, for example, an hour. Thus, if a connection was severed with a TERMINAL, but a file transfer was still pending, when the connection is reestablished, the file transfer can be continued. After an hour, the file transfer would be considered a failure and all artifacts of the partially completed file transfer will be discarded. Similarly, a timer would be set for pacing responses. For example, if a terminal was uploading a file, once it suspended upload in anticipation of a pacing response, it would set a timer for, for example, ten minutes for that pacing response. Failure to receive that pacing response would be considered a failure for the previously transmitted records.

Other timers include character time outs, carrier time outs, polling time outs, and the like. These are well known in the art, and one skilled could add them at appropriate places.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for authorizing transactions using a multi-threaded protocol in a point-of-sale system that includes a terminal and a network, the terminal being coupled to the network, comprising the steps of:

transmitting a first authorization request corresponding to a first transaction from the terminal to the network;

transmitting a first response to said first authorization request from the network to the terminal, said first response including a first approval status for the first transaction;

transmitting a second authorization request corresponding to a second transaction from the terminal to the network before said first response to said first authorization request has been transmitted from the network to the terminal; and transmitting a second response to said second authorization request from the network to the terminal, said second response including a second approval status for the second transaction.

2. The method of claim 1, further comprising the steps of:

transmitting a third authorization request corresponding to a third transaction from the terminal to the network after transmitting said second authorization request from the terminal to the network; and transmitting a third response to said third authorization request from the network to the terminal, said third response including a third approval status for the third transaction.

3. The method of claim 2, wherein the network transmits any available responses to any other authorization requests to the terminal before receiving a further authorization request from the terminal.

4. The method of claim 2, wherein said step of transmitting a second authorization request, and said step of transmitting a third authorization request are each preceded by a step of pausing for a predetermined amount of time to allow the terminal to receive any responses available from the network.

5. The method of claim 2, wherein said third authorization request is transmitted before said first or second response to at least one of said first or second authorization requests has been transmitted from the network to the terminal.

6. The method of claim 1, wherein said second response to said second authorization request is transmitted before said first response to said first authorization request is transmitted.

7. A method for authorizing transactions using a multi-threaded protocol and interleaved file transfers in a point-of-sale system that includes a terminal and a network, the terminal being coupled to the network, comprising the steps of:

transmitting a first authorization request corresponding to a first transaction from the terminal to the network;

transmitting a first response to said first authorization request from the network to the terminal, said first response including a first approval status for the first transaction;

transmitting a second authorization request corresponding to a second transaction from the terminal to the network before said first response to said first authorization request has been transmitted from the network to the terminal;

transmitting a second response to said second authorization request from the network to the terminal, said second response including a second approval status for the second transaction;

initiating a file transfer between the terminal and the network before one of transmitting said first authorization request from the terminal to the network or transmitting said first response to said first authorization request from the network to the terminal;

suspending said file transfer and performing said transmitting said first authorization request step or said first response to said first authorization request step while file transfer is suspended; and resuming said file transfer after transmitting said first authorization request from the terminal to the network or said first response to said first authorization request from the network to the terminal.

8. The method of claim 7, wherein said file transfer is a transmission of a file from the terminal to the network.

9. The method of claim 7, wherein said file transfer is a transmission of a file from the network to the terminal.

10. A method for transferring files while authorizing transactions using a protocol in a point-of-sale system that includes a terminal and a network, the terminal being coupled to the network, comprising the steps of:

initiating a file transfer between the terminal and the network, transmitting a first authorization request corresponding to a first transaction from the terminal to the network;

transmitting a first response to said first authorization request from the network to the terminal, said first response including a first approval status for the first transaction;

suspending said file transfer when transmitting said first authorization request or said first response to said authorization request; and resuming said file transfer after transmitting said first authorization request or said first response to said first authorization request.

11. The method of claim 10, wherein said file transfer comprises a file upload from the terminal to the network.

12. The method of claim 10, wherein said file transfer comprises a file download from the network to the terminal.

13. A terminal of a point-of-sale system for connection to a network capable of multi-threaded authorizations for transactions, comprising:

means for communicating with the network;

means for transmitting a first authorization request corresponding to a first transaction to the network using said means for communicating;

means for receiving a first response to said first authorization request from the network using said means for communicating, said first response including a first approval status for the first transaction;

means for transmitting a second authorization request corresponding to a second transaction to the network before receiving said first response to said first authorization request from the network using said means for communicating; and means for receiving a second response to said second authorization request from the network using said means for communicating, the second response including a second approval status for the second transaction.

14. The terminal of claim 13, further comprising a means for pausing before transmitting an authorization request to allow reception of any available responses from the network.

15. A terminal of a point-of-sale system for connection to a network capable of multi-threaded authorizations for transactions, comprising:

means for communicating with the network;

means for transmitting a first authorization request corresponding to a first transaction to the network using said means for communicating;

means for receiving a first response to said first authorization request from the network using said means for communicating, said first response including a first approval status for the first transaction;

means for transmitting a second authorization request corresponding to a second transaction to the network before receiving said first response to said first authorization request from the network using said means for communicating;

means for receiving a second response to said second authorization request from the network using said means for communicating, the second response including a second approval status for the second transaction;

means for transferring a file with the network using said means for communicating;

means for suspending said file transfer when transmitting an authorization request to the network;

means for suspending said file transfer when receiving a response to said authorization request; and means for resuming said file transfer after transmitting said authorization request or receiving said response to said authorization request.

16. A front-end processor for processing multi-threaded transactions from a plurality of terminals and sending them to a plurality of hosts, the front-end processor comprising:

terminal communicating means for communicating with one of the plurality of terminals;

host communicating means for communicating with one of the plurality of hosts;

means for receiving a first authorization request corresponding to a first transaction from said one of the plurality of terminals using said terminal communicating means;

means for transmitting said first authorization request to said one of the plurality of hosts using said host communicating means;

means for receiving a first response to said first authorization request from said one of the plurality of hosts using said host communicating means, said first response including a first approval status for the first transaction;

means for transmitting said first response to said first authorization request to said one of the plurality of terminals using said terminal communicating means;

means for receiving a second authorization request corresponding to a second transaction from said one of the plurality of terminals before said first response to said first authorization request has been transmitted to said terminal using said terminal communicating means;

means for transmitting said second authorization request to said one of the plurality of hosts using said host communicating means;

means for receiving a second response to said second authorization request from said one of the plurality of hosts using said host communicating means, said second response including a second approval status for the second transaction; and means for transmitting said second response to said second authorization request to said one of the plurality of terminals using said terminal communicating means.

17. The front-end processor of claim 16, further comprising:

means for determining if any responses to any other authorization requests are available from said one of the plurality of hosts, and giving priority to transmitting said responses to said any other authorization requests to said one of the plurality of terminals before receiving any further authorization requests from said one of the plurality of terminals.

18. A front-end processor for processing multi-threaded transactions from a plurality of terminals and sending them to a plurality of hosts, the front-end processor comprising:

terminal communicating means for communicating with one of the plurality of terminals;

host communicating means for communicating with one of the plurality of hosts;

means for receiving a first authorization request corresponding to a first transaction from said one of the plurality of terminals using said terminal communicating means;

means for transmitting said first authorization request to said one of the plurality of hosts using said host communicating means;

means for receiving a first response to said first authorization request from said one of the plurality of hosts using said host communicating means, said first response including a first approval status for the first transaction;

means for transmitting said first response to said first authorization request to said one of the plurality of terminals using said terminal communicating means;

means for receiving a second authorization request corresponding to a second transaction from said one of the plurality of terminals before said first response to said first authorization request has been transmitted to said terminal using said terminal communicating means;

means for transmitting said second authorization request to said one of the plurality of hosts using said host communicating means;

means for receiving a second response to said second authorization request from said one of the plurality of hosts using said host communicating means, said second response including a second approval status for the second transaction;

means for transmitting said second response to said second authorization request to said one of the plurality of terminals using said terminal communicating means;

means for transferring a file with said one of the plurality of terminals using said terminal communicating means;

means for suspending said file transfer when receiving an authorization request from said one of the plurality of terminals or when transmitting a response to an authorization request to said one of the plurality of terminals; and means for resuming said file transfer after said authorization request has been received or said response has been transmitted.

19. A point-of-sale system for authorizing transactions using a multi-threaded protocol comprising:

a controller;

a front-end processor;

means for communicating between said controller and said front-end processor;

means for transmitting a first authorization request corresponding to a first transaction from said controller to said front-end processor using said means for communicating;

means for transmitting a first response to said first authorization request from said front-end processor to said controller using said means for communicating, said first response including a first approval status for the first transaction;

means for transmitting a second authorization request corresponding to a second transaction from said controller to said front-end processor before said first response to said first authorization request has been transmitted from said front-end processor to said controller using said means for communicating; and means for transmitting a second response to said second authorization request from said front-end processor to said controller using said means for communicating, the second response including a second approval status for the second transaction.

20. A point-of-sale system for authorizing transactions using a multi-threaded protocol comprising:

a controller;

a front-end processor;

means for communicating between said controller and said front-end processor;

means for transmitting a first authorization request corresponding to a first transaction from said controller to said front-end processor using said means for communicating;

means for transmitting a first response to said first authorization request from said front-end processor to said controller using said means for communicating, said first response including a first approval status for the first transaction;

means for transmitting a second authorization request corresponding to a second transaction from said controller to said front-end processor before said first response to said first authorization request has been transmitted from said front-end processor to said controller using said means for communicating;

means for transmitting a second response to said second authorization request from said front-end processor to said controller using said means for communicating, the second response including a second approval status for the second transaction;

means for transferring a file between said controller and said front-end processor using said means for communicating;

means for suspending said file transfer when transmitting a response to an authorization request from said front-end processor or when transmitting an authorization request from said controller; and means for resuming said file transfer after transmission of a response to an authorization request from said front-end processor or after transmission of an authorization request from said controller.

21. A point-of-sale system for authorizing transactions using a multi-threaded protocol comprising:

a terminal;

a front-end processor;

means for communicating between said terminal and said front-end processor;

means for transmitting a first authorization request corresponding to a first transaction from said terminal to said front-end processor using said means for communicating;

means for transmitting a first response to said first authorization request from said front-end processor to said terminal using said means for communicating, the first response including a first approval status for the first transaction;

means for transmitting a second authorization request corresponding to a second transaction from said terminal to said front-end processor before said first response to said first authorization request has been transmitted from said front-end processor to said terminal using said means for communicating; and means for transmitting a second response to said second authorization request from said front-end processor to said terminal using said means for communicating, the second response including a second approval status for the second transaction.

22. The point-of-sale system of claim 21, wherein said means for communicating further comprises a controller coupled to said terminal and said front-end processor.

23. The point-of-sale system of claim 22, further comprising:

a plurality of terminals, and wherein said controller is coupled to said plurality of terminals.

24. The point-of-sale system of claim 21, further comprising:
- a plurality of hosts; and
- host communication means for communicating between said front-end processor and said plurality of hosts.

25. The point-of-sale system of claim 21, further comprising:
- means for transferring a file between said terminal and said front-end processor using said means for communicating;
- means for suspending said file transfer when transmitting a response to an authorization request from said front-end processor or when transmitting an authorization request from said terminal; and
- means for resuming said file transfer after transmission of a response to an authorization request from said front-end processor or after transmission of an authorization request from said terminal.

* * * * *